US010080461B2

(12) United States Patent
Bugnano et al.

(10) Patent No.: US 10,080,461 B2
(45) Date of Patent: Sep. 25, 2018

(54) MACHINE AND SYSTEM FOR THE PREPARATION OF LIQUID PRODUCTS USING CAPSULES

(71) Applicant: LUIGI LAVAZZA S.p.A., Turin (IT)

(72) Inventors: Luca Bugnano, Moncalieri (IT); Alberto Cabilli, Moncalieri (IT)

(73) Assignee: LUIGI LAVAZZA S.P.A., Turin (IT)

( * ) Notice: Subject to any disclaimer, the term of this patent is extended or adjusted under 35 U.S.C. 154(b) by 105 days.

(21) Appl. No.: 14/903,937

(22) PCT Filed: Jun. 17, 2014

(86) PCT No.: PCT/IB2014/062285
§ 371 (c)(1),
(2) Date: Jan. 8, 2016

(87) PCT Pub. No.: WO2015/004551
PCT Pub. Date: Jan. 15, 2015

(65) Prior Publication Data
US 2016/0157668 A1    Jun. 9, 2016

(30) Foreign Application Priority Data

Jul. 8, 2013   (IT) .............................. TO2013A0568

(51) Int. Cl.
*A47J 31/06*    (2006.01)
*A47J 31/44*    (2006.01)
(Continued)

(52) U.S. Cl.
CPC ...... *A47J 31/4492* (2013.01); *B65D 85/8043* (2013.01); *B67D 1/0888* (2013.01);
(Continued)

(58) Field of Classification Search
CPC ................ A47J 31/0643; A47J 31/0668; A47J 31/3623; A47J 31/3676; A47J 31/407;
(Continued)

(56) References Cited

FOREIGN PATENT DOCUMENTS

DE    20 2011 001184 U1    3/2011
DE    202011001184 U1 *   3/2011    .............. A47J 31/20
(Continued)

OTHER PUBLICATIONS

Translation of DE202011001184U1 (Attached to Original Document above).*
(Continued)

*Primary Examiner* — Dana Ross
*Assistant Examiner* — Brandon Harvey
(74) *Attorney, Agent, or Firm* — Heslin Rothenberg Farley & Mesiti P.C.; Victor A. Cardona, Esq.

(57) ABSTRACT

A machine for preparing liquid food products using capsules includes a dispensing assembly having a first part and a second part designed to define an infusion chamber between them, a loading arrangement for the insertion of the capsule, an actuation system, a control system, and an arrangement for heating the fluid. A processor of the control system is prearranged for controlling at least the heating arrangement and the feeding arrangement. Encoded instructions contained in a memory of the control system has sets of brewing information that are differentiated from each other according to a type of capsule. The processor is prearranged for comparing an image acquired by an optical sensor device with reference images of the capsules that are encoded in the memory and for associating a set of brewing information to a corresponding type of capsule to select an operation mode.

12 Claims, 15 Drawing Sheets

(51) Int. Cl.
    *B65D 85/804*    (2006.01)
    *B67D 1/08*      (2006.01)
    *G05B 19/042*    (2006.01)

(52) U.S. Cl.
    CPC ...... *G05B 19/0426* (2013.01); *B65D 2203/00* (2013.01); *B65D 2203/06* (2013.01); *G05B 2219/2645* (2013.01)

(58) Field of Classification Search
    CPC ............... A47J 31/4492; B67D 1/0888; B65D 85/8043; B65D 2203/06; G05B 2219/2645
    USPC .......................................................... 99/295
    See application file for complete search history.

(56)           References Cited

FOREIGN PATENT DOCUMENTS

| EP | 2 572 609 A1 | 3/2013 | |
|----|---|---|---|
| FR | 2 874 164 A1 | 2/2006 | |
| WO | 2011/089048 A1 | 7/2011 | |
| WO | 2012/123440 A1 | 9/2012 | |
| WO | WO 2012123440 A1 * | 9/2012 | .............. A47J 31/52 |
| WO | 2013042011 A1 | 3/2013 | |

OTHER PUBLICATIONS

International Search Report for International Application No. PCT/IB2014/062285, dated Aug. 18, 2014.

* cited by examiner

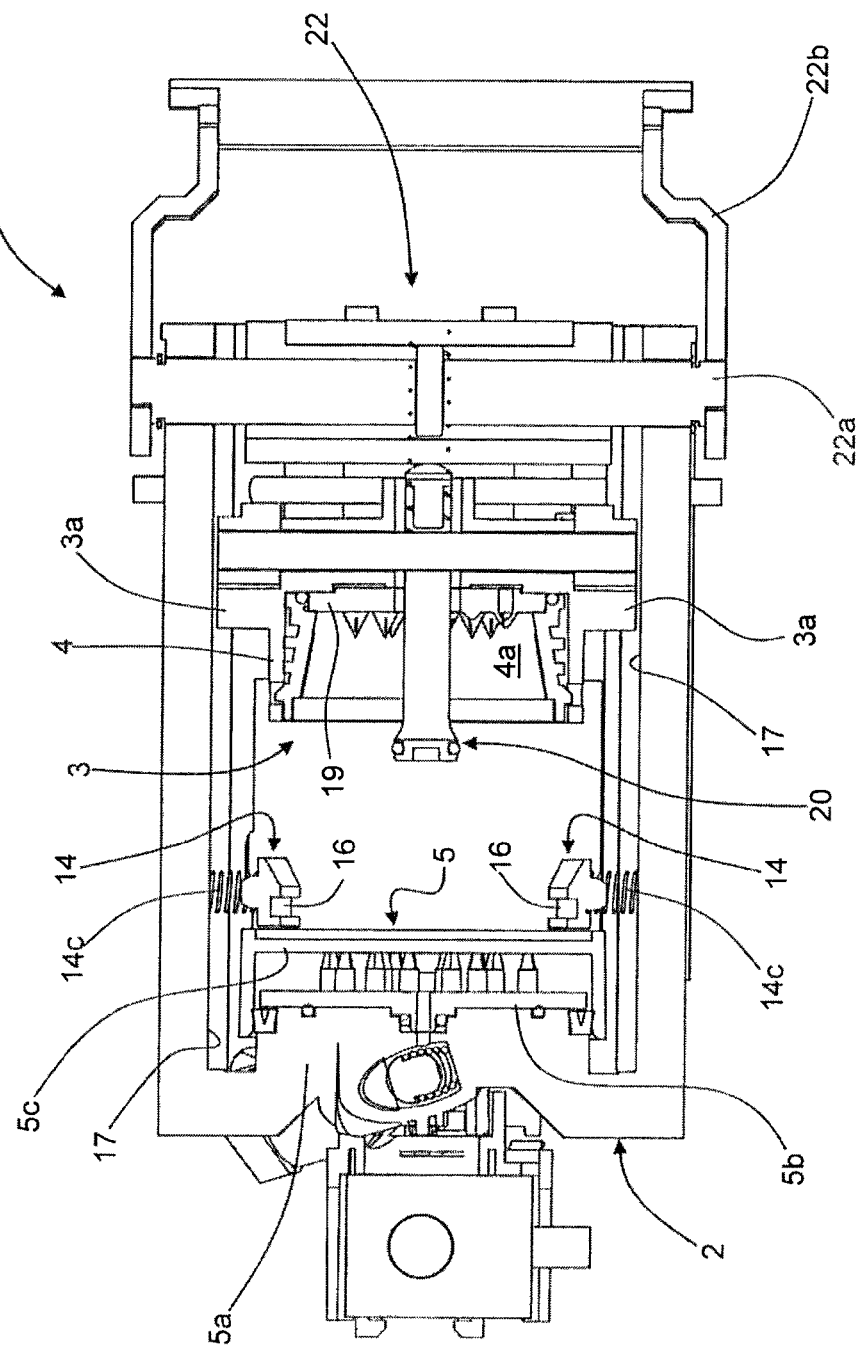

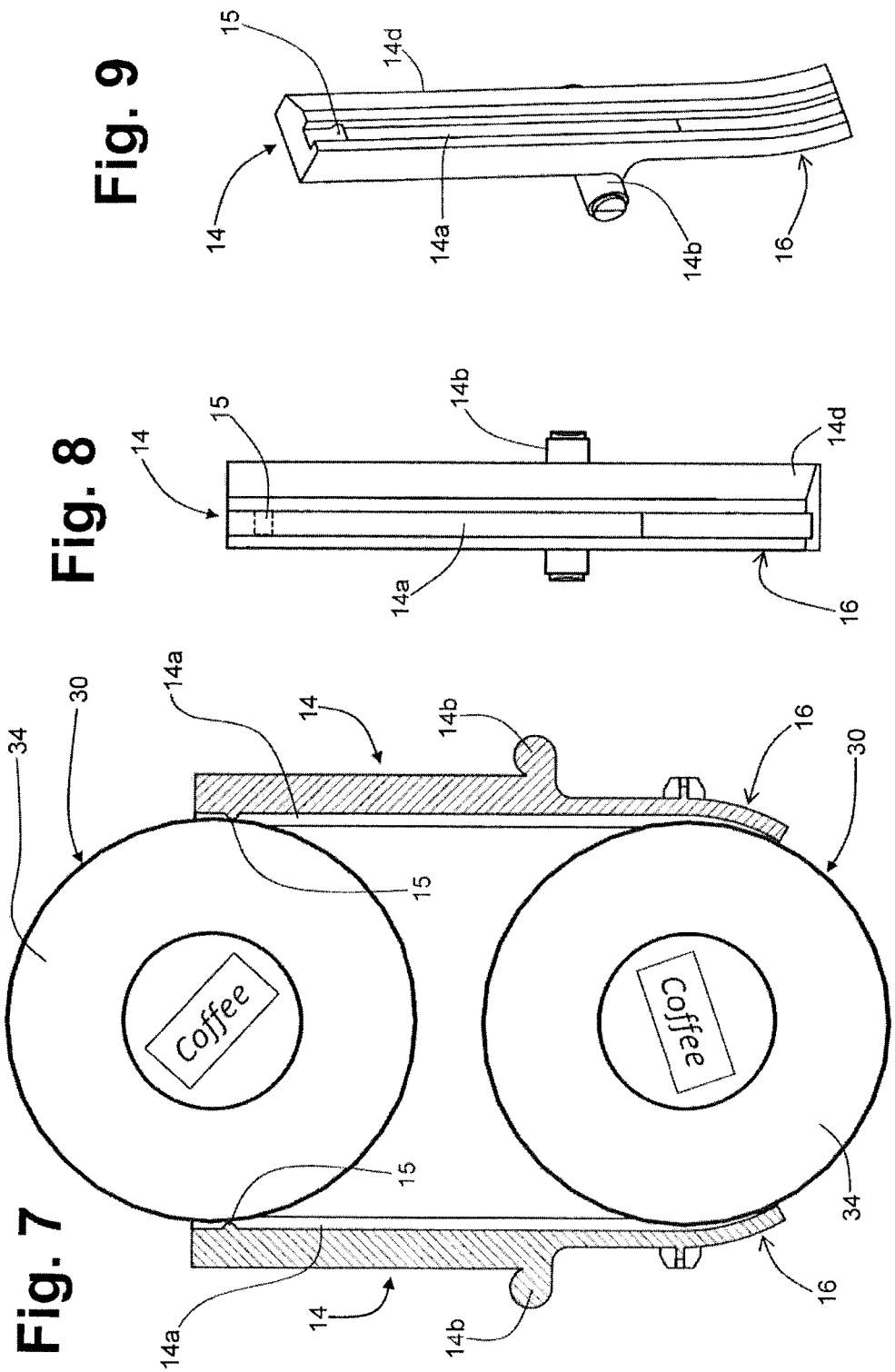

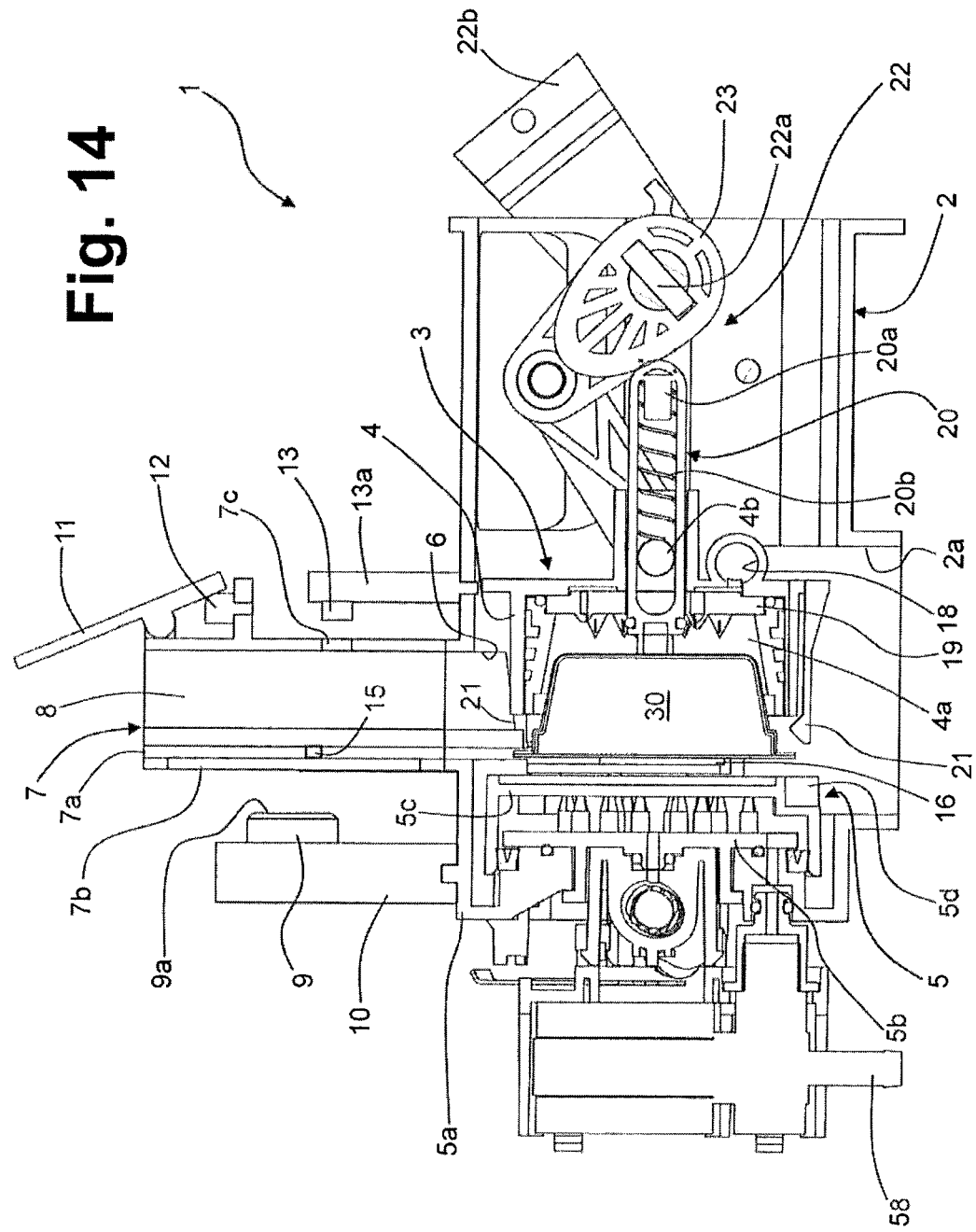

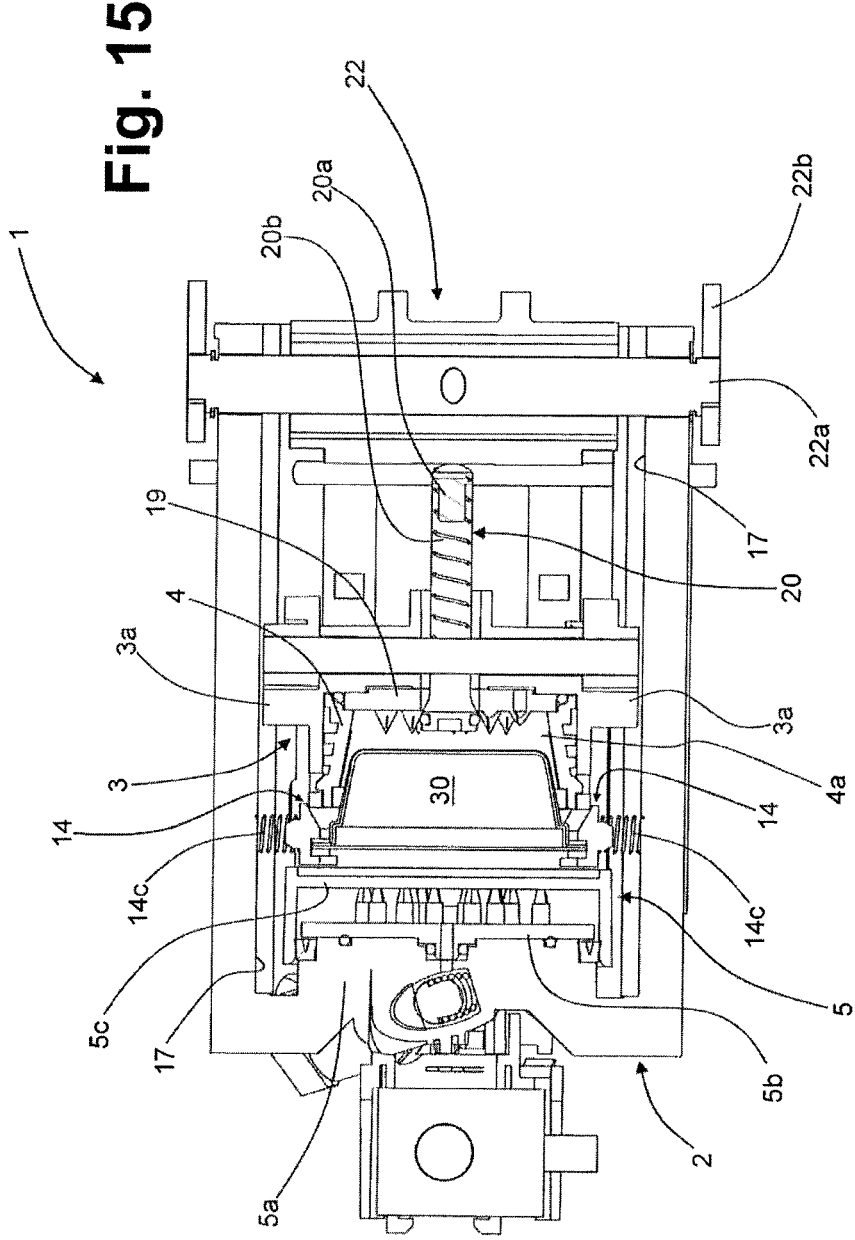

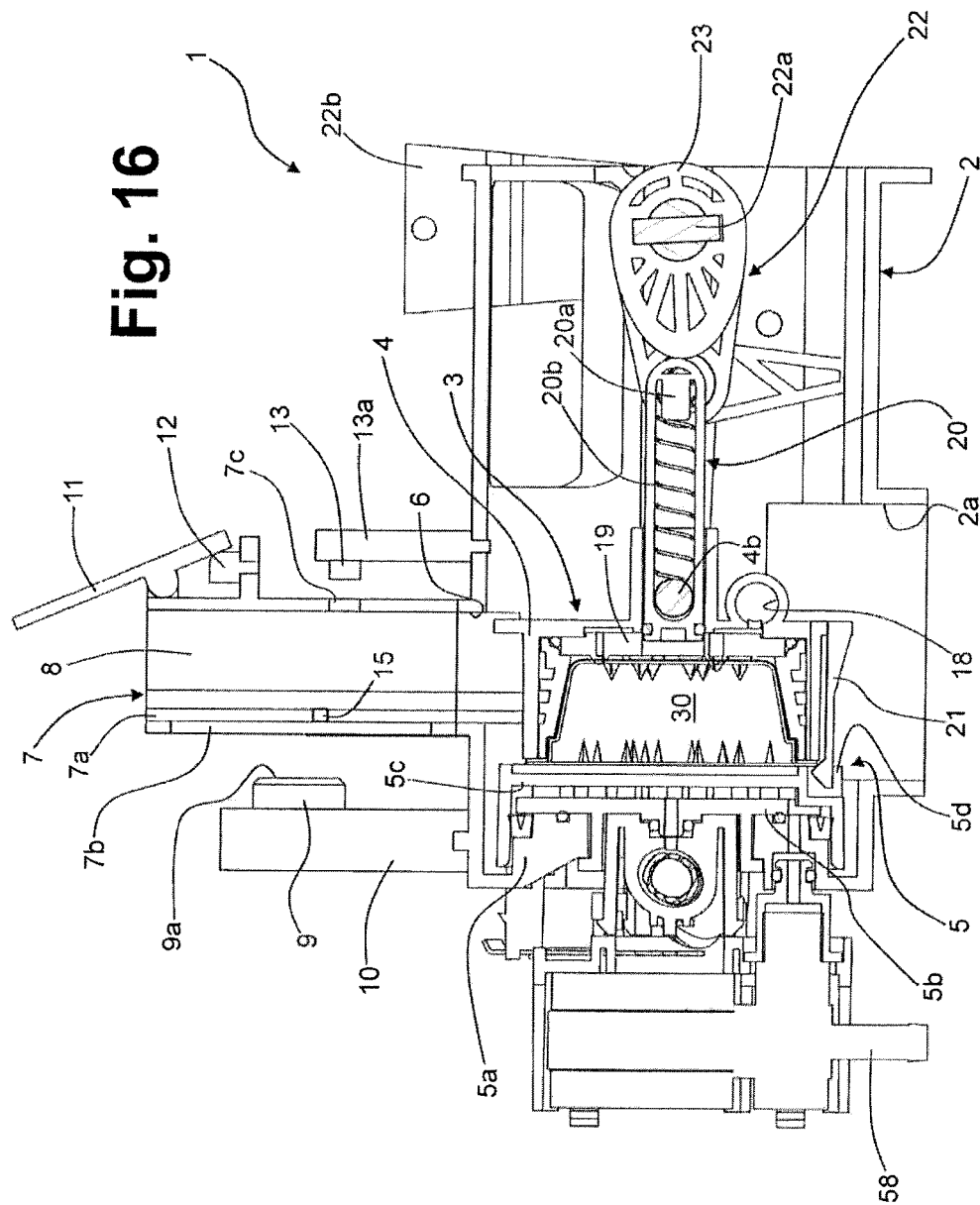

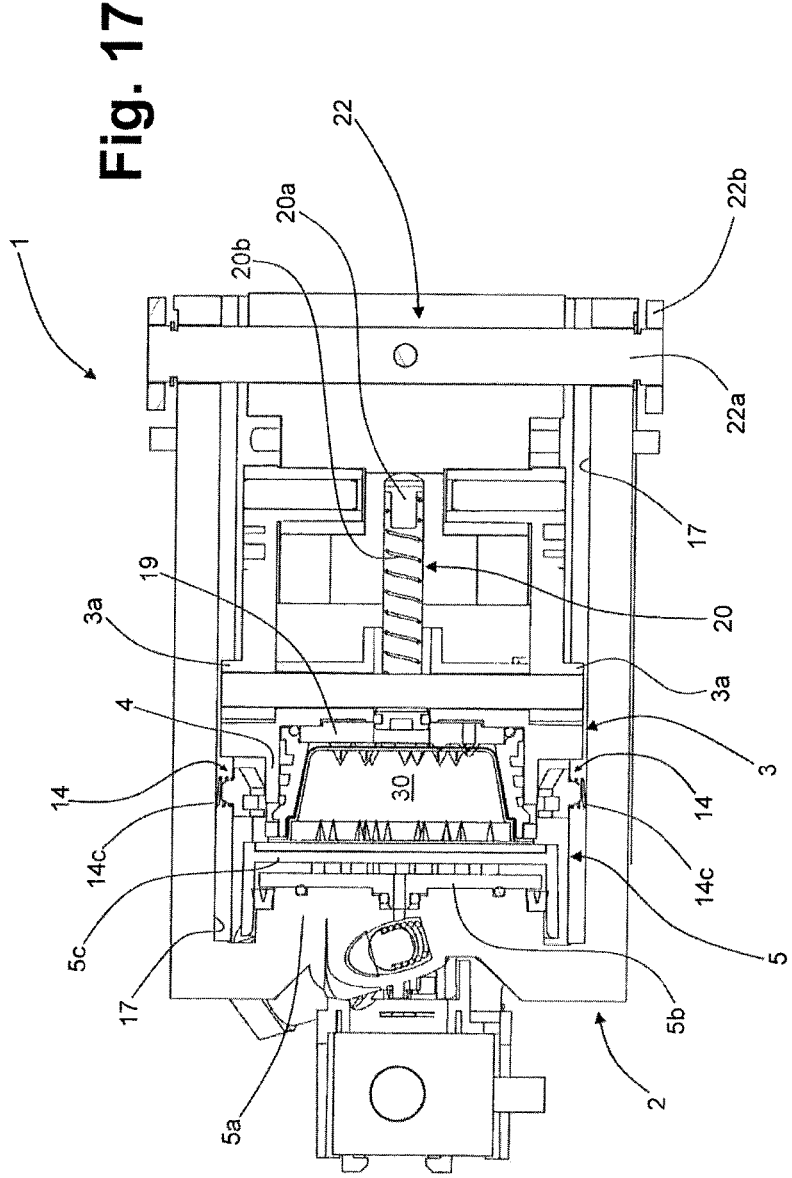

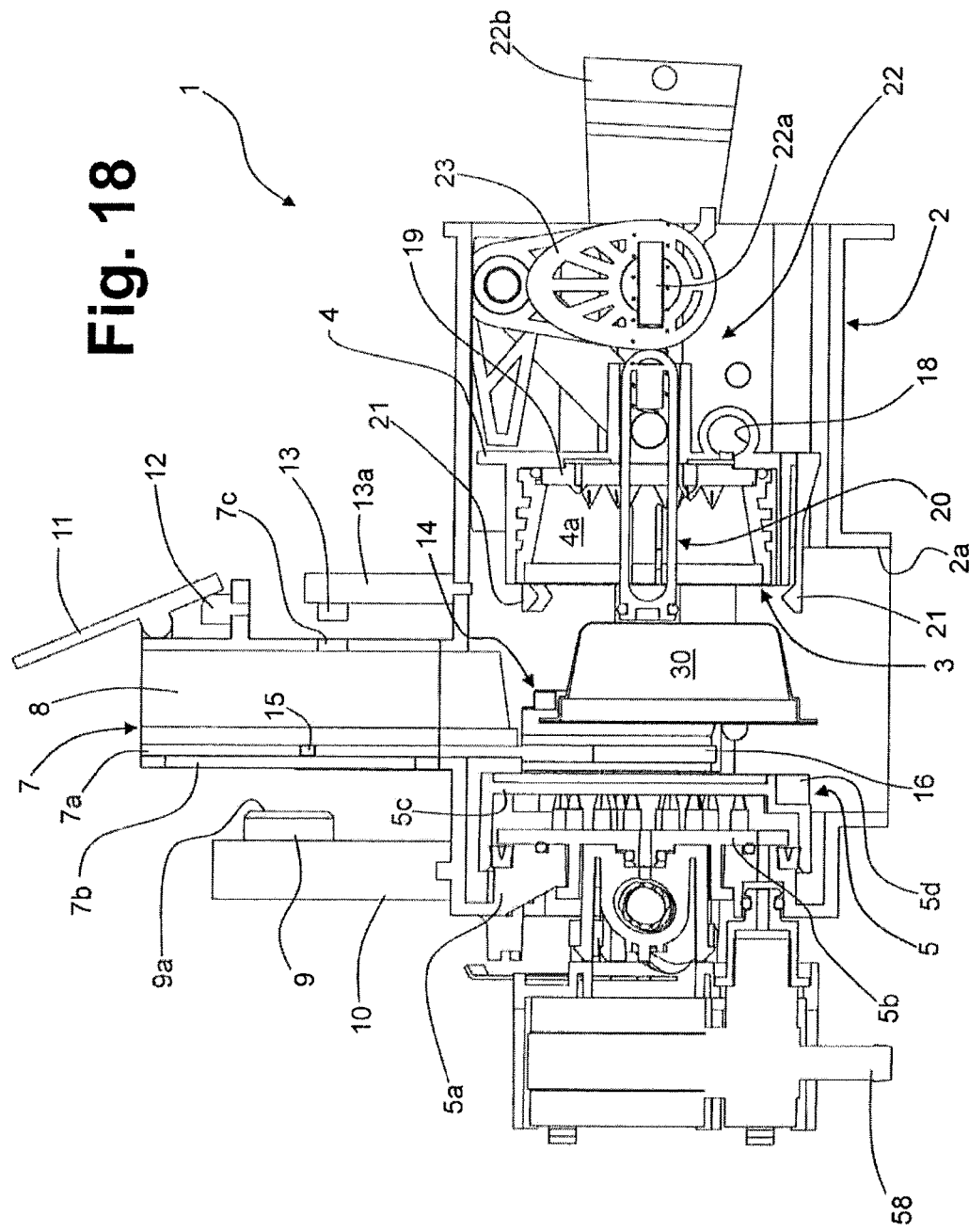

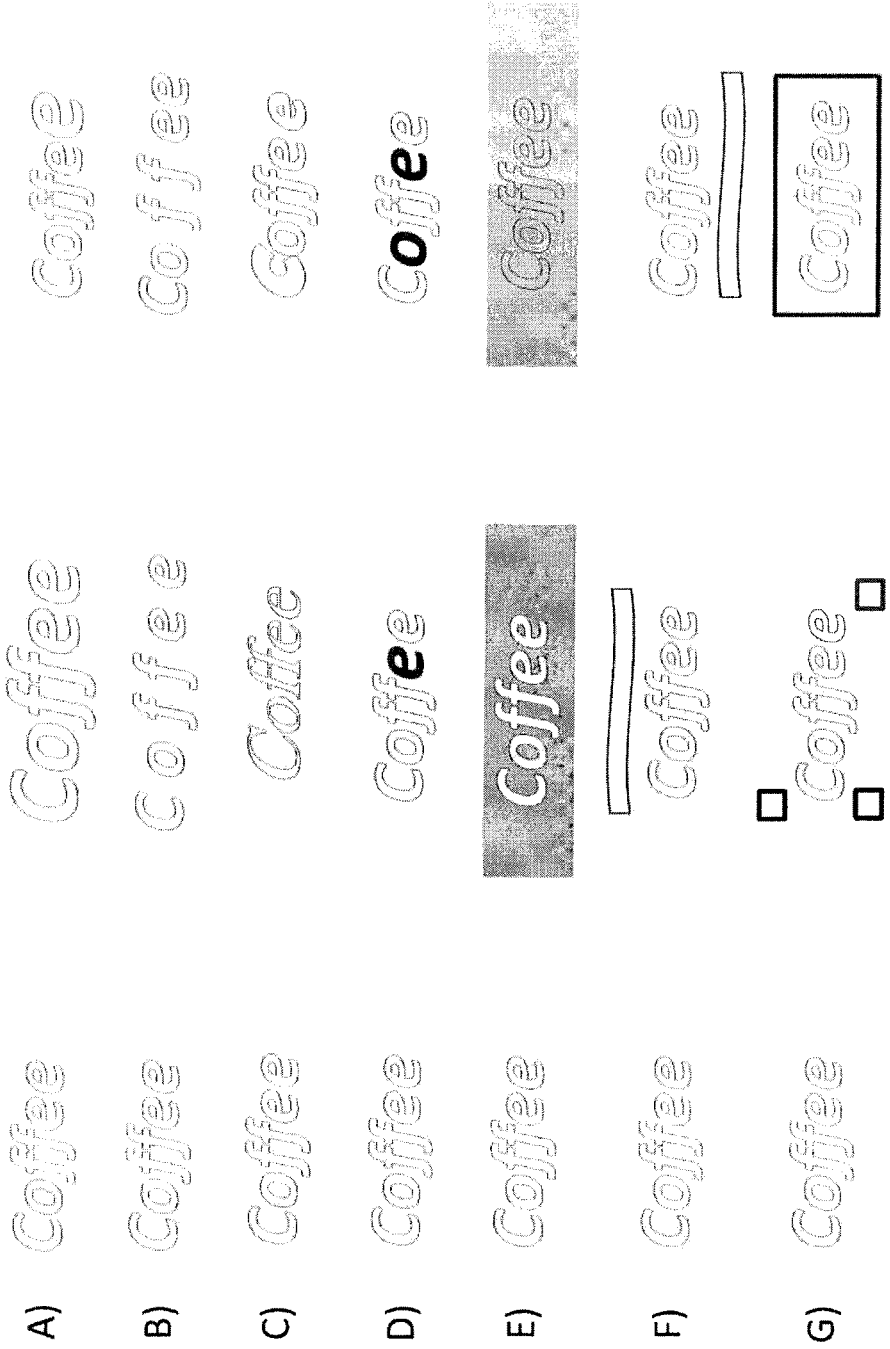

MACHINE AND SYSTEM FOR THE PREPARATION OF LIQUID PRODUCTS USING CAPSULES

CROSS REFERENCE TO RELATED APPLICATIONS

This application is a national stage filing under section 371 of International Application No. PCT/IB2014/062285, filed on Jun. 17, 2014, and published in English on Jan. 15, 2015, as WO 2015/004551 A1, and claims priority of Italian application No. TO2013A000568 filed on Jul. 8, 2013, the entire disclosure of these applications being hereby incorporated herein by reference.

TECHNICAL FIELD

The present invention relates to machines, systems, and methods for the preparation, by means of capsules, of beverages and liquid food products in general. The invention has been developed with particular reference to a machine provided with a control system including an optical sensor device, for detecting graphic information associated to the body of a capsule and controlling an operating mode of the machine accordingly.

PRIOR ART

At the present state of the art various solutions are known designed to enable an automatic recognition of the type of capsule introduced in a machine of the indicated type. These solutions are distinguished by the presence, on the capsule body, of encoding elements of different nature, such as barcodes, magnetic elements, RFID tags, and so on.

For instance, from WO 2011/089048, upon which the preamble of Claim 1 is based, a machine of the type referred to is known, configured for preparing liquid products using capsules which have a substantially cup-shaped body that houses ingredients that are able to form a liquid product together with a preparation fluid, such as for example water.

The machine has a control system, including processing means, memory means, and an optical sensor device, for detecting characteristic information of the capsule, encoded by means of a dedicated graphic code appearing on the front sealing foil of the capsule itself. The processing means are provided for controlling an operating mode of the machine from among a plurality of possible operating modes, on the basis of appropriate programs contained in its memory means and on the basis of parameters assumed each time via the optical sensor device. The graphic code read via the optical sensor is a two-dimensional barcode, which by its nature enables encoding of a significant amount of data, including the type of liquid product associated to the capsule, and its optimal preparation parameters, such as the temperature of the water to be injected or that of the product to be delivered, the pressure of the water, the amount of water, and so forth. In this way, the control system of the machine is able to recognize automatically the type of capsule and acquire therefrom the optimal parameters for preparing the corresponding liquid product. An advantage of the known solution, which is inherent in a two-dimensional barcode (for example, a Datamatrix code or a QR code), is that reading and interpretation of the graphic code does not presuppose a predefined angular positioning of the front of the capsule, i.e., of its sealing foil.

A problem of this type of known approach is that on the market machine are proposed that are able to operate only with the capsules of the corresponding producer. This type of approach has the consequence that, as a matter of fact, the purchaser of an automatic machine is forced to buy capsules for the preparation of liquid products of one and the same origin, that is the capsules provided with a well specific encoding, adapted to be recognized by the machine the purchaser bought, with a certain disadvantage as to the competition and the possibility of choice by the consumer.

AIM AND SUMMARY

In its general terms, the present invention basically proposes to provide a machine of the type referred to that is able to function with a wide range of capsules, also coming from different manufacturers, to advantage of the final consumer.

An auxiliary aim of the invention is to provide such a machine that presents a compact structure, is simple from the constructional and functional standpoint, is convenient to use and is distinguished by a high reliability and safety of operation.

According to the invention, one or more of the above aims are achieved thanks to a machine for the preparation of beverages and liquid products in general having the characteristics recalled in Claim 1. The invention likewise relates to a system and a method for the preparation of beverages that uses the machine according to Claim 1. Advantageous developments of the invention form the subject of the sub-claims. The claims form an integral part of the technical teaching provided herein in relation to the invention.

BRIEF DESCRIPTION OF THE DRAWINGS

Further aims, characteristics, and advantages of the invention will emerge clearly from the ensuing detailed description, with reference to the annexed drawings, which are provided purely by way of non-limiting example and in which:

FIGS. 5 and 6 are schematic cross sections according to the lines V-V and VI-VI of FIG. 2, respectively;

FIG. 7 is a schematic cross section of a device for retaining a capsule, belonging to the dispensing assembly of FIGS. 1-6;

FIGS. 8 and 9 are a front elevation and a perspective view, respectively, of a retaining member of the device of FIG. 7;

FIGS. 14 and 15 are schematic cross-sectional views similar to those of FIGS. 4 and 6, respectively, with the assembly in a step of relative approach between a capsule-holder and an injector thereof;

FIGS. 16 and 17 are schematic cross-sectional views similar to those of FIGS. 4, 6 and 14-15, respectively, but with the capsule-holder and the injector in a position where they are close to one another, in a condition of infusion;

FIG. 18 is a cross-sectional view similar to that of FIGS. 4, 14 and 16, with the dispensing assembly in a condition of expulsion of a capsule; and FIG. 19 is a schematic representation of some examples of differentiation of a graphic sign appearing on a capsule that can be used in a machine according to the invention.

DETAILED DESCRIPTION

Illustrated in the ensuing description are various specific details aimed at providing an in-depth understanding of the embodiments. The embodiments may be obtained without one or more of the specific details, or with other methods, components, materials, etc. In other cases, structures, materials, or operations that are known or evident to the person skilled in the branch are not illustrated or described in detail so that the various aspects of the embodiments will not be obscured. Reference to "an embodiment" or "one embodiment" in the framework of the present description is meant to indicate that a particular configuration, structure, or characteristic described in relation to the embodiment is comprised in at least one embodiment. Hence, phrases such as "in an embodiment" or "in one embodiment" and the like that may be present in various points of the present description do not necessarily refer to one and the same embodiment. Furthermore, particular conformations, structures, or characteristics may be combined in any adequate way in one or more embodiments. The references used herein are merely provided for convenience and hence do not define the scope of protection or the scope of the embodiments.

Figure 1:
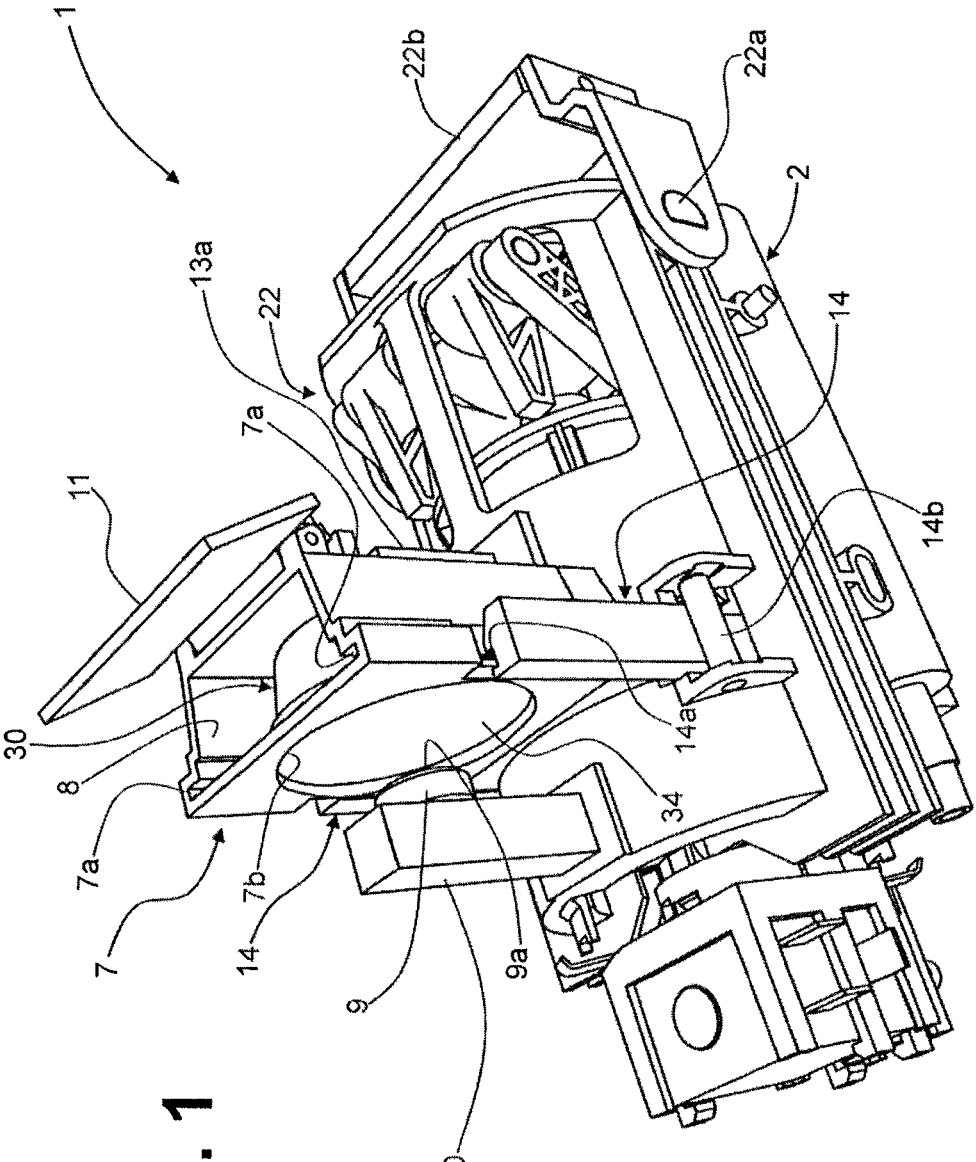
FIG. 1 is a schematic perspective view of a dispensing assembly of a machine for preparing liquid products using capsules according to one embodiment of the invention, in a step of insertion of a capsule into the assembly itself.
Figure 2:
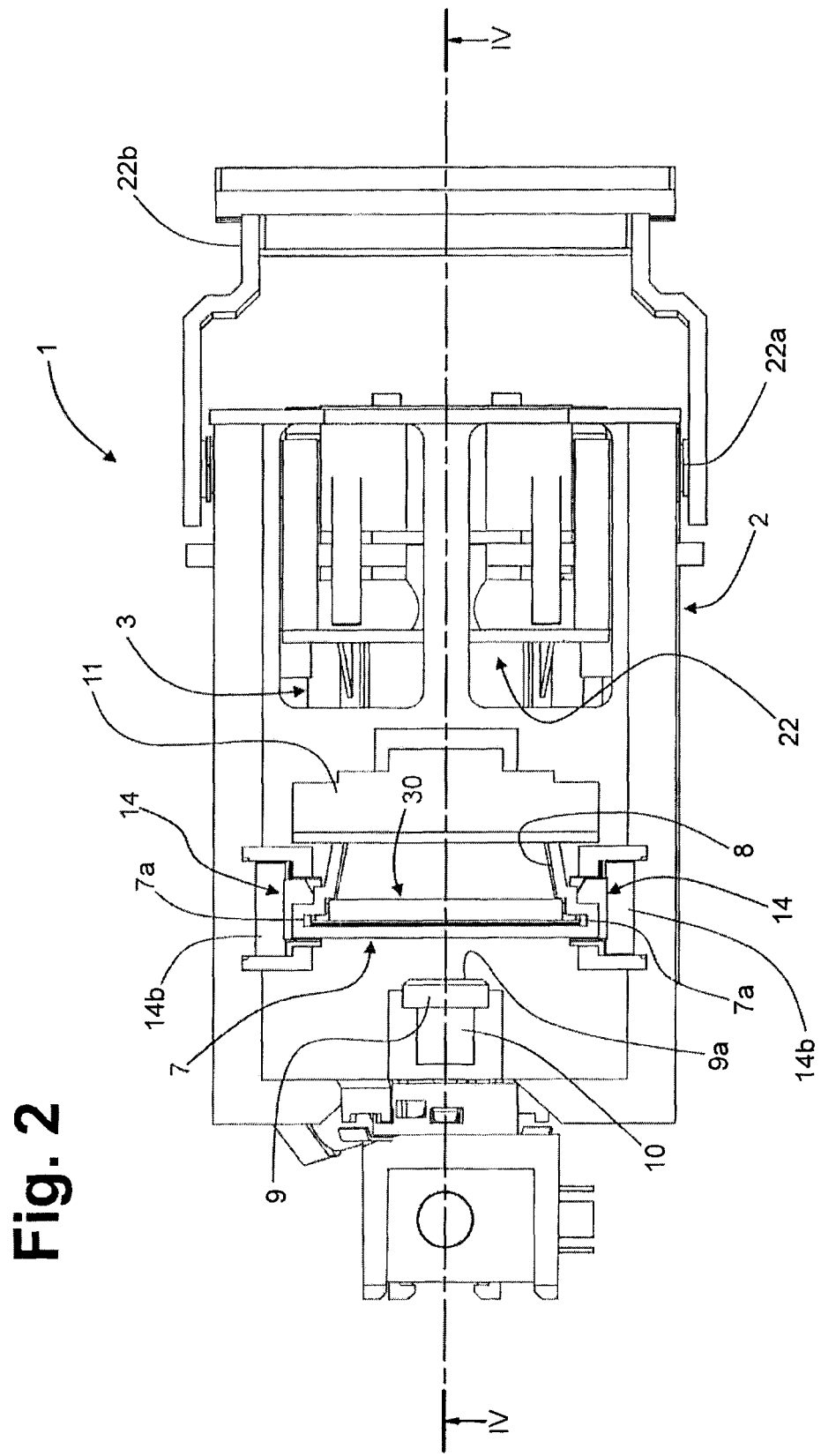
FIGS. 2 and 3 are a schematic top plan view and a schematic view in side elevation of the assembly of FIG. 1.
Figure 3:
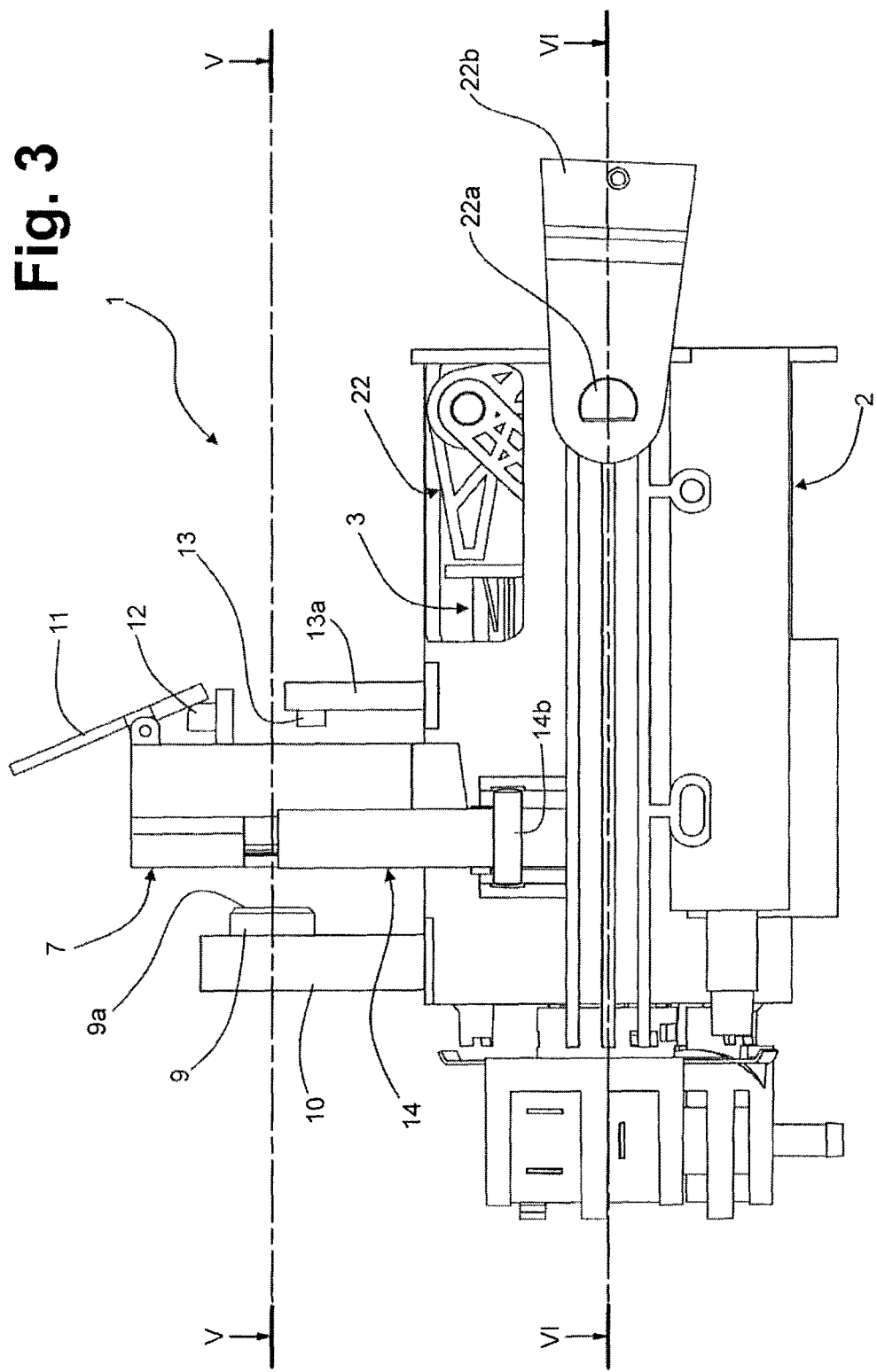
Figure 4:
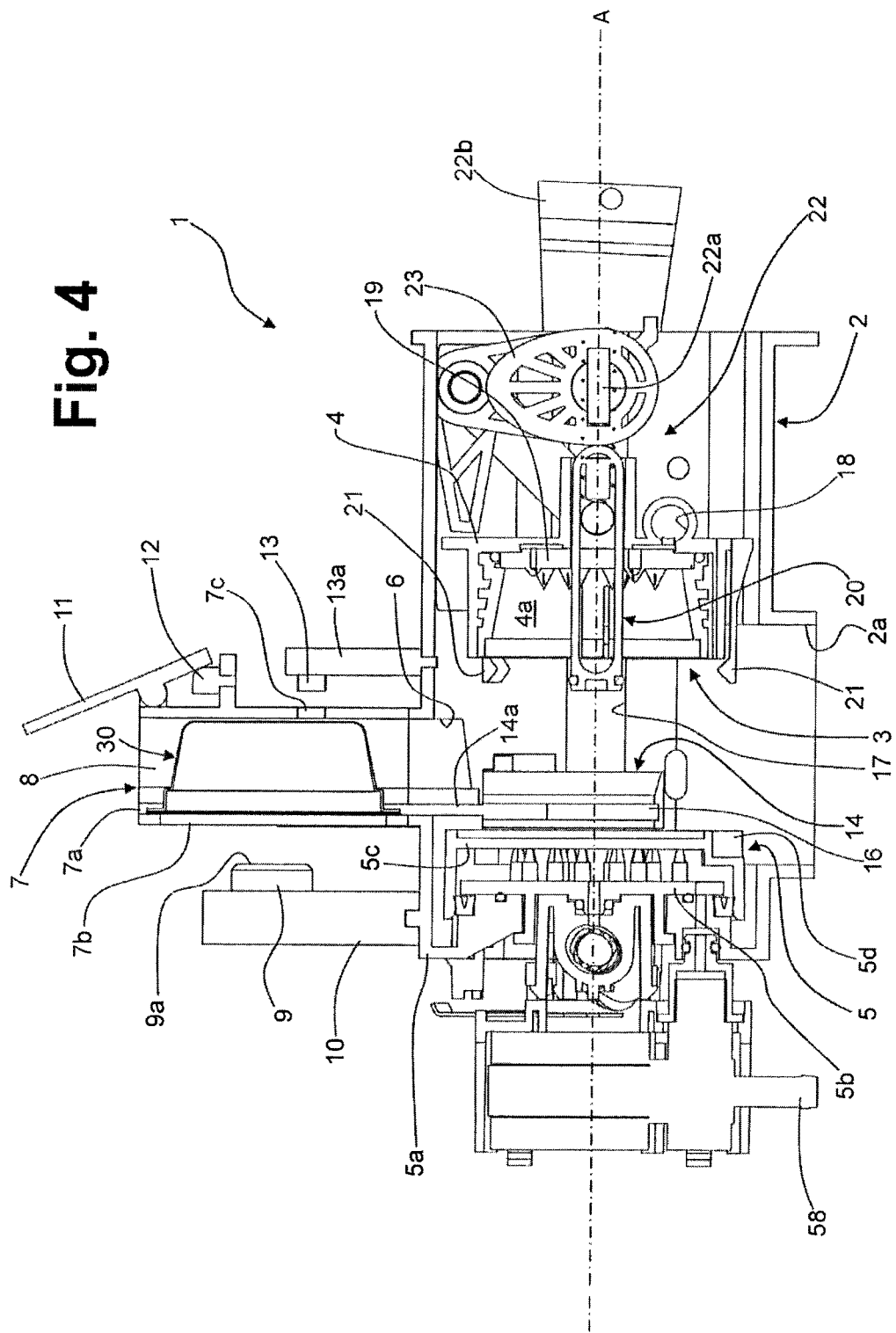
FIG. 4 is a schematic cross section according to the line IV-IV of FIG. 2.
Figure 5:
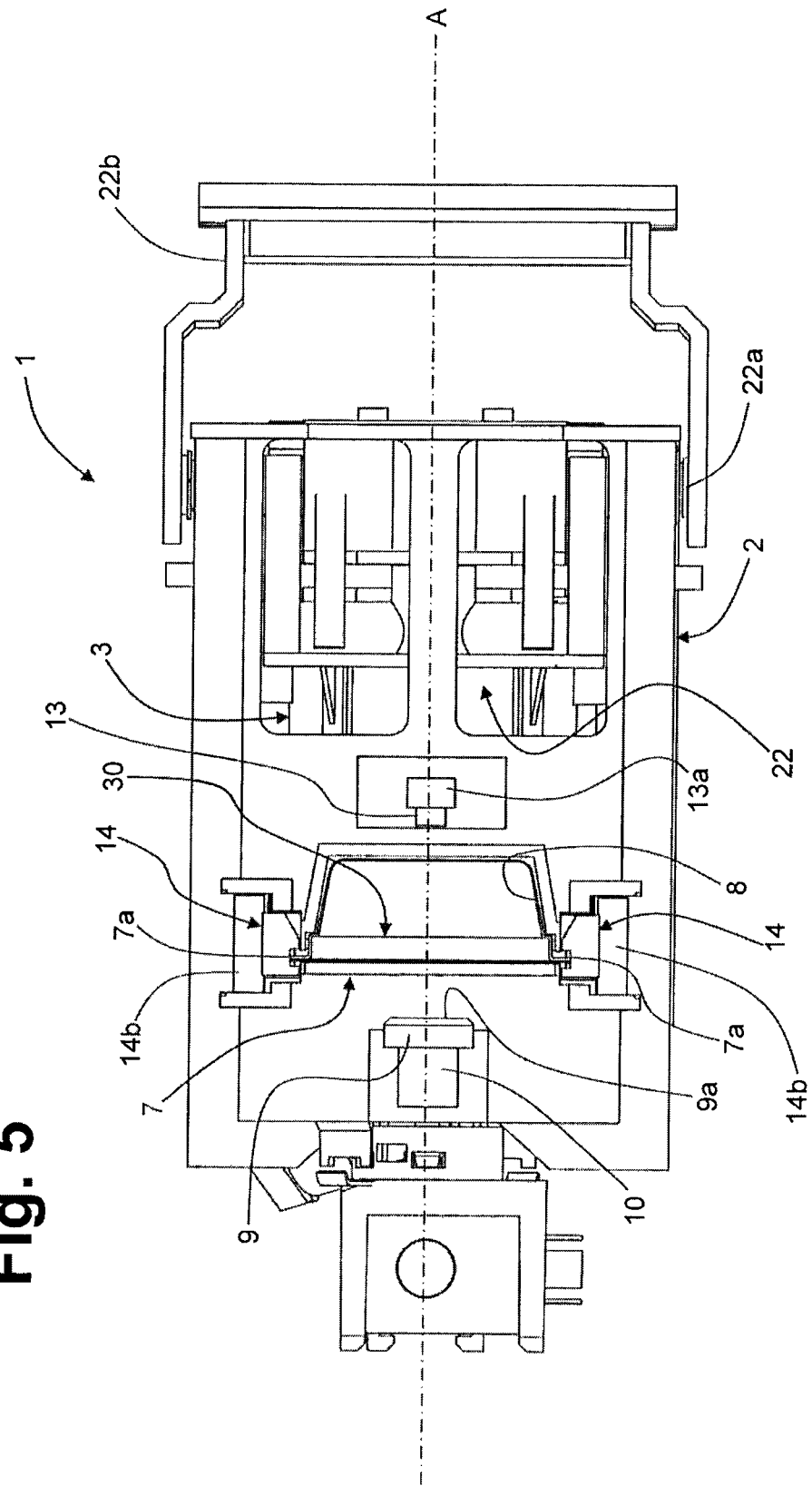

In FIGS. 1-6, designated as a whole by 1 is the dispensing assembly of a machine according to one embodiment of the invention, which in this case extends as a whole according to a horizontal axis, designated by A in FIGS. 4 and 5. The assembly 1 has a supporting structure, which in the figures is exemplified in the form of a casing 2 having an approximately cylindrical shape. Located within the casing 2 are a first part and a second part of an infusion chamber, at least one of which is movable with respect to the other. In the example illustrated (FIG. 4), the first part includes a capsule-holder 3, designed to house at least partially a capsule and to deliver the liquid product obtained therefrom. The capsule-holder 3, which substantially shares the axis A, comprises a body 4 that is mounted movable with respect to the casing 2 and defines a housing 4a that is able to receive part of a capsule. The second part of the infusion chamber comprises an injector device, referred to hereinafter for simplicity as "injector", designated by 5, designed to introduce into a capsule water and/or steam under pressure, supplied through a suitable duct. In the example illustrated, the injector 5 substantially shares the axis A and preferably, but not necessarily, is mounted in a stationary position with respect to the casing 2. In embodiments (not represented), the injector 5 may be movable in order to obtain an approach between the injector itself and the capsule-holder 5. It is to be noted that, in possible variant embodiments (not illustrated), the function of injection of the fluid into the capsule can be obtained in the first part 3 of the infusion chamber, and the function of delivery of the liquid product can be obtained in the second part 5 of the infusion chamber.

In its upper part the casing 2 has an insertion opening, designated by 6 in FIG. 4, forming part of a loading arrangement, for insertion of a capsule into the assembly 1, as far as a loading position thereof. Provided at the opening 6 is an insertion guide 7, here substantially vertical, even though an arrangement of the guide inclined with respect to the vertical is not excluded. A capsule, designated by 30 in FIG. 4, is inserted in the guide 7 and withheld in an intermediate position of a path thereof towards the aforesaid loading position, as described hereinafter.

In one embodiment, such as the one exemplified, the guide 7 is stationary, rises from the upper part of the casing 2 and has at least a respective substantially tubular portion that extends axially, thereby defining a passage 8 for introduction and guiding of the capsules. In the example, the cross section of the guide 7 has a profile substantially corresponding to the cross section of the capsules so as to enable guided introduction thereof with relative precision into the assembly 1. In this perspective, preferably, the guide 7 defines two guide cavities 7a, which are vertical and opposed to one another and between which the flange of a capsule 30 can be received.

In the example illustrated, the body of the guide 7 has at least one discontinuity 7b, where an optical sensor device 9 is positioned, belonging to the control system of the machine according to the invention. The optical sensor 9 is preferably a video camera or a photographic camera, designed for acquisition of an image of at least one portion of one of the end faces of the body of a capsule, in particular the face 34 including a sealing foil, as may be seen in FIG. 1.

In the example illustrated, the discontinuity 7b is an opening present in the side of the guide 7 facing the optical sensor 9, this opening having dimensions such that a substantial part of the aforesaid sealing foil 34 of the capsule 30 is exposed to an active image-acquisition part 9a of the optical sensor 9. In the example, the opening 7b has a generally circular profile, through which the most part of the sealing foil of the capsule is exposed to the optical sensor 9, but this is not strictly necessary, since acquisition of a central area of the aforesaid foil is also sufficient. The discontinuity 7b may be constituted, instead of by an opening, by a transparent stretch of the wall of the guide 7 that faces the optical sensor 9, in which case the aforesaid transparent part may possibly be configured for performing functions of lens. Of course, the entire body of the guide 7 may be made of a transparent plastic material. It will also be appreciated that the guide 7, instead of having a structure at least in part tubular, may include two generally parallel upright elements, each of which defines a respective guide cavity 7a. In this case, the discontinuity that enables exposure of the sealing foil 34 of the capsule to the optical sensor 9 is represented by the free space between the aforesaid two upright elements.

Once again with reference to the example illustrated, the optical sensor 9 is preferentially supported by a corresponding support 10 that rises from the upper part of the casing 2, generally parallel to the guide 7. In any case, the sensor is mounted laterally with respect to the guide 7, preferably on the outside of the casing 2 of the assembly 1.

In a preferred embodiment, such as the one illustrated, upstream of the upper end or entry mouth of the guide 7 a displaceable element is provided, here represented by a hatch 11, hinged for turning according to a substantially horizontal axis, preferably a normally closed monostable hatch.

In the practical embodiment, the assembly 1 is practically completely housed within a casing (not represented) of the machine for preparing beverages, with the upper mouth of the guide 7 that projects at least slightly on the outside of the casing, or that is substantially flush with an opening of the casing of the machine. The hatch 11 may thus be hinged to the body of the guide 7, as in the case exemplified, or else on the outside of the casing of the machine, at the upper inlet of the guide 7. The hatch 11 is mounted movable between an open position and a closed position, in which access to the mouth of the guide 7 is prevented or allowed, respectively; in the figures, for simplicity, the hatch 11 is represented in an intermediate position.

Preferably, associated to the hatch 11 is an electrical control means, such as a switch, designated by 12 in FIGS. 3 and 4, preferably a micro-switch. The switch 12 can be switched between two different conditions, one of which corresponding to an open position of the hatch 11 such as to enable introduction of a capsule 30 into the guide 7. For instance, the switch 12 may be of a normally open type, which is able to switch into the position of closing of an electrical circuit when the hatch 11 reaches the aforesaid open position. As will be seen hereinafter, the function of the switch 12 associated to the hatch 11 is to start off or enable, via the control system of the machine, a step of acquisition by the optical sensor 9 of an image associated to the body of a capsule 30 that is introduced into the assembly 1.

In a particularly advantageous embodiment, such as the one exemplified, the control system of the machine comprises a second sensor device 13, configured for detecting the presence of a capsule 30 after it has been introduced into the guide 7. In the case exemplified (see FIGS. 3 and 4) also the presence sensor 13 is mounted laterally with respect to the guide 7, preferably but not necessarily on a support 13a, on the side of the guide 7 opposite to the one that the optical sensor 9 faces. The sensor 13 may be of any type designed to detect the presence of a capsule in an intermediate position of the path of displacement of the capsule towards its loading position, described hereinafter, and in any case in a position such that the presence of a capsule can be detected before the latter passes beyond the area of image acquisition by the sensor 9, here identified by the opening 7b of the guide 7.

In the example represented, the active part of the sensor 13 faces a corresponding discontinuity 7c of the guide 7, such as an opening or a transparent part or just a free space. As will be seen hereinafter, the function of the presence sensor 13 is to activate a step of detection by the sensor 9. For this purpose, preferentially activation of the sensor 9 depends upon a detection made by the sensor 13, activation of which in turn depends upon the condition of switching of the switch 12.

The presence sensor 13 may itself be a micro-switch, with a corresponding feeler that drives closing of the circuit when it comes into contact with the body of a capsule. Preferentially, however, the sensor 13 is a sensor that does not come into physical contact with the capsule, for example a proximity sensor or a sensor including an emitter and a receiver of electromagnetic radiation, such as an emitter diode and a phototransistor, possibly integrated in one and the same opto-electronic component available on the market: in the latter case, very schematically, via the emitter electromagnetic radiation is emitted with a predefined wavelength or with a predefined range of wavelengths, for example infrared radiation, the beam impinging on the outer surface of the bottom wall of the capsule at a certain angle, and being then reflected at least in part onto the receiver, thereby enabling determination of the presence of the capsule; in the case of absence of the capsule, the radiation is not instead reflected onto the receiver. The sensor 13 may include a photoelectric-cell system, with the emitter and the receiver set in opposite positions on the passage 8 defined by the guide 7 so that a beam of radiation from the emitter to the receiver is interrupted when a capsule is set between them. The presence sensor may be positioned also to interact with a peripheral wall of the capsule, instead of with an end wall thereof. It will also be appreciated that, in principle, there is nothing to rule out positioning the sensor 13 on the same side of the guide 7 as where the sensor 9 is located.

The loading arrangement of the machine includes means for retention of a capsule after it has been inserted into the guide 7. For this purpose, in an advantageous embodiment, a retaining device is provided prearranged so as to define both an intermediate position of retention of a capsule, in which the capsule itself is kept in a static condition and exposes at least a part of its own sealing foil 34 to the optical sensor 9, and the aforementioned loading position, in which the capsule is substantially coaxial to at least one of the capsule-holder 3 and the injector 5.

In a preferred embodiment, the retaining device comprises two opposed elements, here defined as "jaws", designated by 14. The jaws 14 are set substantially symmetrically on opposite sides of the axis A, in one and the same transverse plane and are mounted so that they can oscillate according to respective axes generally transverse to the direction of displacement of the capsule along the guide 7. In one embodiment, each jaw 14 has a respective vertical groove 14a (see FIG. 1) that extends at least in part underneath a corresponding cavity 7a of the guide 7, as far as within the assembly 1, in an intermediate position between the injector and the capsule holder (see FIG. 4).

The jaws 14 hence extend in length substantially perpendicular to the axis A and are articulated via at least one pin 14b, here substantially parallel to the axis A, coupled to the casing 2. The jaws 14 may be provided with springs or similar elastic means 14c (partially visible in FIGS. 6, 15, and 17), provided for pushing the jaws themselves towards a position of equilibrium or where they are set close together. In other embodiments, the aforesaid position is obtained without the aid of dedicated springs, and the intrinsic elasticity of the material constituting the jaws 14—for example, a plastic material—is exploited to enable divarication thereof, without rotation pins. In the non-limiting example represented, the jaws 14 are articulated in a generally lower region thereof, but obviously the point of articulation may be different.

Figure 10:
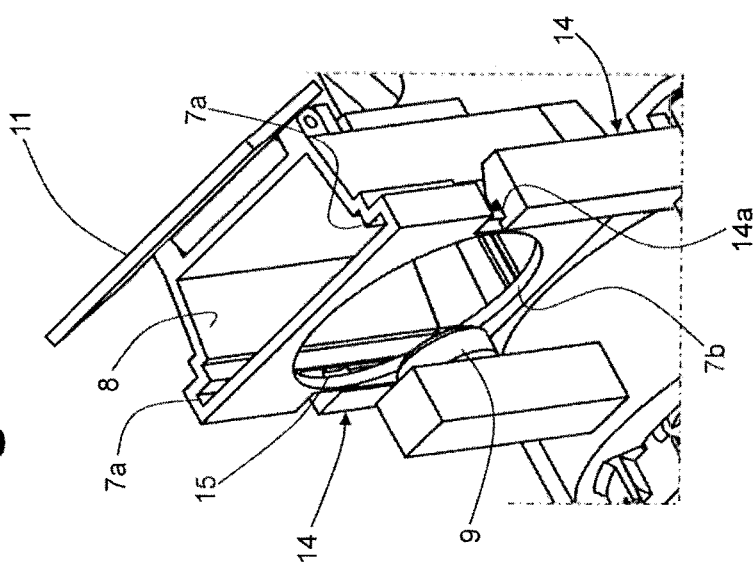
FIG. 10 is a portion of the dispensing assembly of FIG. 1, in the absence of a capsule.

In the embodiment illustrated, the jaws 14 are configured for defining two different positions of retention, and precisely an intermediate position of retention and a final position of retention, downstream of the previous one, corresponding to the loading position of the capsule. In order to clarify this aspect, FIG. 7 illustrates, via a merely schematic cross section, a possible embodiment of the opposed jaws 14, with the simultaneous artificial presence of two capsules 30 between them, FIGS. 8 and 9 illustrate a jaw 14 in front elevation and in perspective view, respectively, and FIG. 10 illustrates in perspective view a portion of the assembly 1 of FIG. 1, in the absence of a capsule in the guide 7.

Present within the grooves 14a, in a generally upper position thereof, are two first retaining means or elements 15, for example formed by projections of the body of a jaw 14 towards the inside of the corresponding groove 14a. In the case exemplified, the upper part of the jaws 14 extends on the outside of the guide 7, and the retaining elements 15 are located at respective interruptions of the cavities 7a of the insertion guide 7.

The retaining elements 15 are in relative positions such that, when the jaws 14 are in the position of equilibrium where they are set close to one another, they arrest the movement by gravity of the capsule 30 along the cavities 7a and the grooves 14a, i.e., they constitute a hindrance to sliding of the flange of the capsule, as represented schematically in the case of the capsule 30 shown in the top position in FIG. 7. By causing a temporary divarication of the jaws 14, the retaining elements 15 move away and thereby enable prosecution of the movement of the capsule 30 downwards, by gravity, along the cavities 7a and then along the grooves 14a. In an advantageous embodiment, release of the capsule from the first retaining elements 15 is obtained following upon application on the capsule of a force of thrust in its direction of movement, for example a manual thrust, such as to cause divarication of the jaws 14 that brings the elements 15 out of interference with the peripheral profile of the flange of the capsule.

In the lower part of the jaws 14, there are then provided two second retaining means or elements 16, here formed by generally converging lower portions of the two jaws 14 or in any case shaped in such a way that the lower ends of the grooves 14a are closer to one another than are the retaining elements 15, when these are in the corresponding position of release. In other words, when a thrust downwards is applied to a capsule 30 in order to free it from the first elements 15, the jaws 14 divaricate, but the presence of the second elements 16 in any case arrests the downward travel of the capsule 30 that has in the meantime been freed from the first elements 15, even in the case where the jaws 14 had not yet returned elastically to the position of equilibrium. This second retaining condition is highlighted by the capsule 30 represented in the bottom position in FIG. 7. As has been said, the position defined by the second retaining elements 16 corresponds, in one embodiment, to the loading position of the capsule, in which it is axially aligned to the capsule-holder 3.

The body of each jaw 14 is shaped—in particular in a part thereof internal to the casing 2—so as to interact or interfere with parts or elements of the capsule-holder 3 in order to bring about divarication of the jaws themselves in the course of the relative movement between the injector 5 and the capsule-holder 3, in such a way that the capsule is released from the second retaining elements 16 here represented by the lower portions of the jaws 14. For this purpose, for example, the body of the jaws 14 may be provided with corresponding lead-ins or inclined planes, or present projections designed to co-operate with corresponding parts present on the capsule-holder, such as lead-ins or inclined planes. In FIGS. 8 and 9 examples of lead-ins are designated by 14d.

The first retaining elements and the second retaining elements do not necessarily have to be integrated in one and the same device including two jaws and could hence also have a conformation different from the one exemplified here, albeit preserving the general function of identifying two positions of retention of a capsule, one downstream of the other, during its displacement in the direction and according to the orientation determined by the guide 7. For instance, the first retaining elements can themselves include two opposed jaws, above two other jaws that form the second retaining elements; or again, the first retaining elements may comprise one or more elastic tabs or elements set in a retractile way along the guide 7, with the second retaining means constituted by underlying jaws.

The position of retention defined by the second retaining means 16, i.e., the position of loading of the capsule, does not necessarily mean that the capsule shares the axis A. In this position, in fact, the axis of a capsule could also be parallel or slightly inclined with respect to the axis A: in such an embodiment the conicity of the peripheral wall of the capsule and of the housing defined by the capsule-holder can be exploited to obtain a relative movement of centring between the elements in question, during advance of the capsule-holder, as clarified hereinafter.

With reference once again to FIG. 4 and to FIG. 6, in a preferred embodiment, defined on each of the two opposite sides of the casing 2 is a linear guide, designated by 17. In the two guides 17, which are parallel to one another and to the axis A, respective lateral guide elements (visible for example in FIG. 6, where they are designated by 3a) of the capsule-holder 3 are engaged. As has been mentioned, the capsule-holder 3 then has parts or elements configured to bring about divarication of the jaws 14 as it advances towards the injector 5, these parts possibly comprising, for example, front elements and/or a leading edge of the capsule-holder 3 which define an inclined plane, designed to interact with corresponding lead-ins or inclined planes defined on each jaw 14, such as the lead-ins 14d of FIGS. 8-9.

The cup-shaped body 4 of the capsule-holder 3 defines the corresponding housing 4a. For this purpose, the body 4 has a side or peripheral wall, which defines an inner surface of the housing 4a that is substantially frustoconical, or has some other shape congruent with that of the side wall of the capsules used. The body 4 has a bottom wall with a corresponding passage (not indicated), which sets the inside of the housing 4a in fluid communication with a duct 18 for delivery of the liquid product that can be obtained using the capsule.

To the inner side of the bottom wall of the housing 4a there can be associated a perforating device 19, comprising one or more tips or reliefs. Irrespective of the specific conformation of such a device 19, the arrangement is such that the liquid that flows out of the capsule, which is torn at the bottom by the aforesaid tips, can reach the delivery duct 18. The latter may be connected, for example via a flexible tube or a rigid coupling with a number of mating profiles, to a nozzle for delivery of the liquid product. On the other hand, the invention may be applied also to the case of dispensing assemblies for capsules that have a pre-perforated bottom wall, in which case it is not necessary to provide a perforating device inside the capsule-holder.

In a preferred embodiment, the assembly comprises ejector means, designed to push a capsule towards the outside of the housing 4a according to a relative displacement between the injector 5 and the capsule-holder 3 from the close position to the spaced-apart position.

These ejector means preferably comprise a longitudinally extended ejector member, which is movable with respect to the capsule-holder 3. In the example, the bottom wall of the capsule-holder 4 is traversed by a passage which substantially shares the axis A, in which the ejector member is slidably mounted. In the example, the ejector member is configured as rod or stem 20, having a cross section preferably at least in part cylindrical. The stem 20 also passes through a central passage of the supporting wall of the perforating device 19 inside the capsule-holder, when such a perforating device is provided. Preferentially, operatively set between the capsule-holder 3 and the stem 20 is a spring, for forcing the stem itself towards a retracted position within the chamber. In the example, the stem 20 has a longitudinal cavity, represented for example in FIG. 14, in which a guide projection 4b of the body 4 of the capsule-holder is located, and set between the aforesaid projection 4b and a contrast element 20a at the distal end of the aforesaid longitudinal cavity is the above spring, designated by 20b.

In its mouth part, the housing 4a is limited by a leading annular edge, and the capsule-holder 3 has coupling members 21, which project at the front beyond the aforesaid leading edge. In one embodiment, three coupling members 21 are provided, set at approximately 120° apart, at least one of which is preferably positioned in the lower area of the capsule-holder 4, as may be seen, for example, in FIG. 4. The members 21 form part of a system aimed at facilitating separation of a capsule from the injector 5, in a step of discharge of the spent capsule in the cycle of use of the assembly 1.

The members 21 may be pivoted to the body 4 of the capsule-holder 3 and forced elastically into a position of closing towards the axis A, for example by means of a spring or other accumulator of mechanical energy. In another embodiment, such as the one exemplified, the aforesaid closing position is obtained without the aid of dedicated means, and the intrinsic elasticity of the material constituting the members 21—for example, a plastic material—is exploited to enable divarication thereof. The members 21 may be formed integral with the body 4 and/or provided so that the position of closing thereof is obtained in the absence of elastic loading: in such a case, the presence of possible elastic means and/or the intrinsic elasticity of the constitutive material is exploited for enabling opening or divarication of the members 21 and subsequent return thereof to the closed position. Preferentially, the coupling members 21 have, in the respective front region, a respective tooth, where the aforesaid front region projects at the front beyond the leading edge of the capsule-holder 3.

The machine has an actuation system 22, which can be operated to bring about relative movements of the injector and the capsule-holder between a spaced-apart position, in which the capsule can reach its loading position, and a close position, in which the injector and the capsule-holder define between them the infusion chamber, for enabling injection of the fluid into the capsule. The spaced-apart position is visible in FIGS. 4 and 6, whilst the close position is visible in FIGS. 16 and 17.

In various embodiments, such as the one exemplified, the actuation system 22 comprises a substantially toggle or connecting-rod/rocker mechanism, which may for example be governed manually by a user via a lever. In other embodiments, the actuation mechanism may include gears.

The aforesaid mechanism preferably includes a shaft 22a that extends between the two opposite sides of the casing 2 and that is able to turn about an axis substantially perpendicular to the direction of displacement of the capsule-holder 3, here substantially coinciding with the axis A. The casing 2 defines for this purpose passages—with possibly associated bearing members or the like—for the end regions of the shaft 22a, which project outside the casing itself, as may be seen, for example, in FIG. 1; to these projecting ends of the shaft 22a there may be constrained a lever 22b, represented only partially, for manual actuation. The mechanism may then comprise a system of rockers and connecting rods according to known technique. The specific implementation of the mechanism, which could also be driven electrically, is regardless of the purposes of the present invention and could hence be of any known type. Preferably, the actuation system 22 is designed to cause relative movements of the injector 5 and the capsule-holder 3 between the aforesaid spaced-apart position and the aforesaid close position, in a direction of displacement that is generally transverse to the direction of movement of a capsule determined by the insertion guide 7.

With reference to the embodiment exemplified in the drawings, starting from the retracted position of the capsule-holder 3, visible in FIG. 4—the actuation system 22 is driven to cause—for example, with the lever 22b—a counter-clockwise rotation of the shaft 22a. This rotation can be obtained also in an assisted way, for example by equipping the assembly with a controllable electric actuator, in which case the lever 22b is not indispensable. This rotation brings about actuation of the mechanism such as to cause a thrust forward of the capsule-holder 3 towards the injector 5. As has been said, in the example considered, the capsule-holder 3 is constrained to perform the linear movement in opposite direction, thanks to the engagement of the elements 3a in the opposed guides 17: in this way, it is possible to determine approach of the capsule-holder 3 to the injector 5. By causing then a rotation in a clockwise direction of the shaft 22a it is possible to obtain a reverse displacement, i.e., a recession of the capsule-holder 3 away from the injector 5.

In one embodiment, such as the one represented, a leading end of the stem 20 is provided with a sealing ring (not indicated), whilst the rear end of the stem 20 has a generally rounded configuration in order to co-operate with a cam member 23 that is fixed with respect to the shaft 22a in rotation. As will emerge hereinafter, the rear end of the stem 20 provides a cam-follower that co-operates with a cam surface defined by the member 23. In another embodiment, the stem may also be constrained in a substantially stationary position at its rear end.

The cam/cam-follower coupling referred to above is configured in such a way that, in the passage from the position where the injector 5 and the capsule-holder 3 are set at a distance apart to the position where they are set close up to one another, the stem 20 assumes a position with respect to the bottom of the capsule-holder 3 such as not to interfere with insertion of a capsule 30 in the housing 4a, whereas in the passage from the position where the injector 5 and the capsule-holder 3 are set close up to one another to the position where they are set at a distance apart, the stem 20 assumes a position with respect to the bottom of the capsule-holder 3 such as to cause expulsion of the capsule 30 from the housing 4a.

Figure 11:
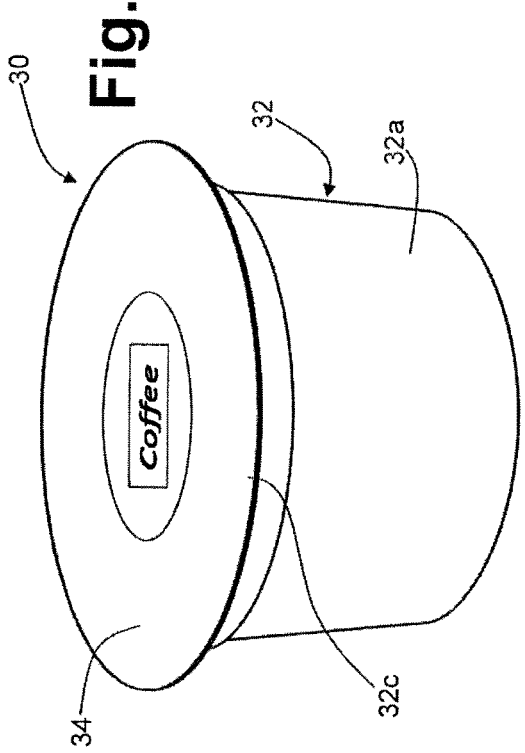
FIGS. 11 and 12 are a perspective view and a cross-sectional view, respectively, of a sealed capsule that can be used in a machine according to the invention.
Figure 12:
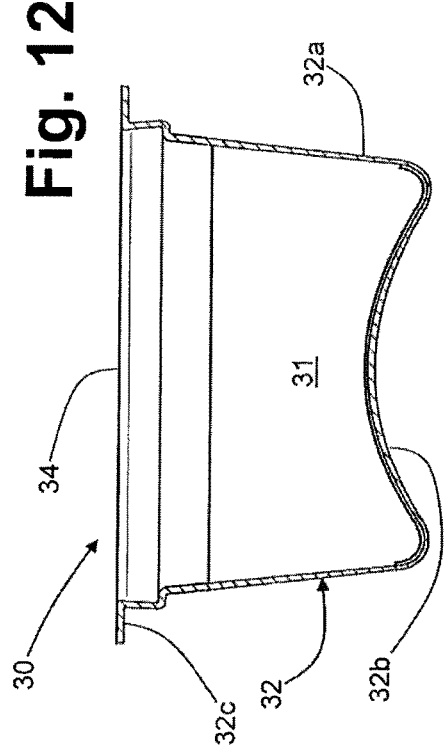

Illustrated merely by way of example in FIGS. 11 and 12 is a capsule 30 (also known as "cartridge") that can be used in a machine according to the present invention, as already exemplified above. This capsule 30 has a structure that is basically known, which is here described merely to enable easier understanding of an embodiment of the present invention.

The capsule 30 contains a dose 31 of at least one substance that is able to form a liquid product via water and/or steam. The dose 31 may be constituted by ground coffee, or by another precursor of a liquid product, such as for example a beverage, tea, powdered or granular chocolate, products for preparing broth, soups, drinks and infusions of various nature: the above list is to be understood as being provided purely by way of non-imperative example, and in the framework of the invention also capsules containing soluble substances are to be understood as being included. In what follows, for simplicity, reference will be made to the preparation of coffee, with the dose 30 that is hence understood as being constituted by ground coffee.

In the structure of the capsule 30, shaped substantially like a tray or small cup within which the dose 31 is located, it is possible to distinguish:

a body 32, comprising a side or peripheral wall 32a and a lower wall or bottom wall 32b that closes the body 32 at one end of the side wall 32a; and an upper wall or closing wall that closes the capsule 30 at the end opposite with respect to the bottom wall 32b; in the example illustrated, the capsule 30 is a hermetically closed capsule, with the aforesaid upper wall that is constituted by a sealing foil 34.

In the example, the wall or foil 34 is connected in a fluid-tight way, for example by heat sealing, to the side wall 32a of the body 32 of the capsule, in particular to an outer flange thereof 32c which surrounds the mouth part of the body 32 and that extends towards the outside in a direction transverse with respect to a central axis of the body 21. In the case exemplified, the body 32 has a cup-like conformation or is shaped like a tray diverging from the bottom wall 32b towards the end closed by the foil that forms the wall 34. Preferentially, this diverging conformation is a frustoconical conformation, which is not on the other hand imperative, in so far as the capsule 30 may present as a whole different shapes, for example a cylindrical, prismatic, frustopyramidal shape, or the like. Also the bottom wall 32b may be variously shaped; for example, it may be plane, concave, or convex.

Associated to one of the end walls 32b and 34 of the body 32 is graphic information characteristic of the type of capsule, for example the type of liquid product, e.g., strong coffee, or weak coffee, or Americano, or cappuccino, or tea, etc. Preferably, the above information is present on the foil 34.

The aforesaid information may be inscribed in a circular area concentric to the centre of the respective wall of the capsule body—here the wall or foil 34—tough this is not strictly essential for the purposes of implementing the invention. As it will result clear hereinafter, in fact, the aforesaid information is not represented by a specific graphical code, but rather by whichever graphical symbology.

Figure 13:
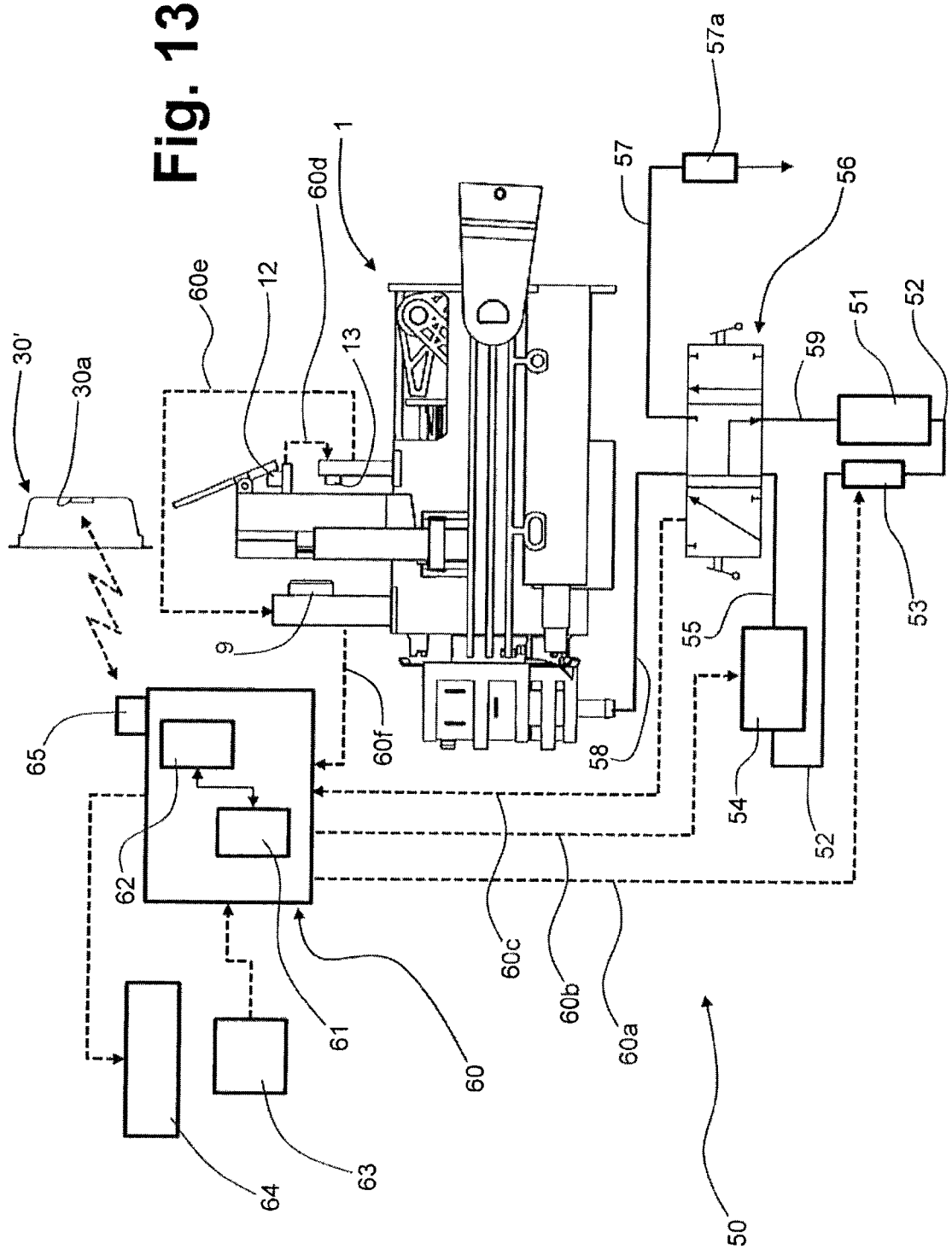
FIG. 13 is a schematic representation of a possible embodiment of a machine for preparing liquid products according to the invention.

Represented schematically in FIG. 13 is a machine for preparing liquid products according to one embodiment of the invention, designated as a whole by 50.

The machine 50 comprises a tank 51 for cold water, with an outlet duct 52 on which a pump 53, of a type in itself known, for example an electromagnetic pump, is operative. Via the duct 52 the tank 51 is connected to an inlet of a boiler 54, which is also of a type in itself known. An outlet of the boiler 54 is connected to a duct 55 for supplying hot water and/or steam under pressure to an inlet of a distributor device, for example a slide distributor, designated by 56. When the distributor 56 is in a first operating position (on the left in FIG. 13) it sets the duct 55 in communication with a duct 57 that supplies the nozzle 57a of an external arm for delivery of hot water and/or steam; when, instead, the distributor 56 is in a second operating position (to the right in FIG. 13), the duct 55 is set in fluid communication with a duct 58 for supplying hot water under pressure to the dispensing assembly 1 and especially to its injector 5. Finally, when the distributor 56 is set in an inoperative position (at the centre, as illustrated in FIG. 13), the duct 55 is in fluid communication with a duct 59 for return of water to the tank 51. Of course, the scheme of FIG. 13 is merely an example, with the distributor 56 that may be motor-driven or replaced by suitable connectors and electrical valve means governed by the control system of the machine 50, for example in the case of machines that are not provided with the nozzle 57a. In the case of a manually operated distributor, preferentially associated thereto are electrical sensor means (for example, one or more micro-switches) for detecting the position assumed by the distributor. In what follows, it is assumed, merely by way of example, that the distributor can be operated manually and has associated thereto electrical switching means.

FIG. 13 represents, once again schematically, the control system of the machine, including a control unit 60 comprising processing means, such as for example a microcontroller 61, and non-volatile memory means 62, in which instructions for operation of the machine are encoded, for example in the form of one or more operating programs.

The control unit 60, and especially the microcontroller 61, is provided for controlling the heating means of the machine, here represented by an electrical resistance of the boiler 54, as well as the means for supply of the fluid to be injected into a capsule, here represented by the pump 53, to obtain a plurality of possible operating modes of the machine on the basis of the aforesaid encoded instructions contained in the memory means 62 and on the basis of information acquired from a capsule 30 by way of the sensor 9.

In the example, the dashed arrows 60a and 60b exemplify the control lines from the unit 60 to the pump 53 and to the boiler 54, respectively. Obviously, the pump and the boiler may also be configured for issuing a feedback signal to the unit, for example via a pressure and/or flow-rate sensor and a temperature sensor, respectively. The dashed arrow 60c exemplifies the control line between the sensor means associated to the distributor 56 and the unit 60 so that the latter knows the operating position imparted manually on the distributor (as has been said, in the case of completely automatic operation, it may be the unit 60 that governs positioning of such a distributor or the operating condition of valve means that are provided in place of it). The arrow 60d exemplifies the control line between the switch 12 and the presence sensor 13, whereas the arrow 60e exemplifies the control line between the presence sensor 13 and the optical sensor 9. Finally, the arrow 60f exemplifies the line of communication between the optical sensor 9 and the unit 60.

As has been said, the scheme provided herein has the sole purpose of highlighting in an intuitive way the functional connection between the various parts of interest, since the circuit arrangement may be variously configured, the functions thereof remaining the same. For instance, the switch 12, the sensor 13, and the sensor 9 could all come under the unit 60, i.e., with the switch 12 that communicates the open condition of the hatch 11 to the unit 60, and the latter that accordingly verifies the state of the sensor 13 and, in the case of detection of a capsule, activates the sensor 9 for the time necessary for image acquisition. In another embodiment, opening of the hatch 11 causes closing of the switch 12 (which is normally open), thereby enabling supply of the sensor 13. The latter, which is for example an opto-electronic component of the type referred to previously, also functions as switch (which is normally open, in the absence of a capsule) and is set in the supply circuit of the sensor 9: detection of a capsule thus enables supply of the sensor 9 for the acquisition time deemed necessary in the design stage.

To return to FIGS. 4 and 6, the injector 5 has a respective main body 5a, stationary with respect to the casing 2, and here provided with a perforating device, which may be of any known conception. In the example represented, the body 5a has a cavity that houses at least in part the aforesaid perforating device, designated by 5b. This device 5b basically comprises one or more tips—preferably an array of tips—facing the capsule-holder 3 and substantially parallel to the axis A. The tips may have a structure provided with at least an axial opening or an axial groove in order to enable supply of the fluid under pressure within a capsule 30, after perforation of its foil 34. Irrespective of the specific conformation of the body 5*a* and of the device 5*b*, the arrangement is such that the fluid under pressure that is supplied by means of the duct 58 to the injector 5 can penetrate into the capsule 30 after perforation of its foil 34.

Once again with reference to the non-limiting example illustrated, the cavity of the body 5*a* is closed at the front by a closing member 5*c*, which shares the axis A, and is defined hereinafter for simplicity as "plate". The plate 5*c* is provided with holes aligned or substantially coaxial to the tips of the device 5*b*, and is able to slide towards the inside of the cavity of the body 5*a*, countering the elastic reaction of a spring (not indicated). The plate 5*c* may have a substantially disk-shaped body, in particular having the shape of a lobed disk, with a front wall provided with the holes for the aforesaid tips, and rear appendages provided with end teeth engaged in corresponding linear guides defined in the peripheral wall of the body 5*a*. The outer face of the front wall of the plate 5*c* is preferentially provided with a gasket, which is also provided with holes for the tips of the perforating device 5*b*. The plate is preferentially provided at the rear with an annular gasket, designed to constitute a seal with respect to the body 5*a*.

In the embodiment exemplified, the body of the plate 5*c* is shaped for defining passages or recesses, one of which is designated by 5*d* in FIG. 4, in axial positions corresponding to those of the coupling members 21 of the capsule-holder 3. At the aforesaid front recesses of the plate 5*c*, the corresponding front gasket is preferably provided with corresponding slits or windows. The aforementioned rear appendages of the plate 5*a*, in addition to preventing the front of the plate itself from sliding out, are preferentially sized and positioned in such a way that the front surface of the plate 5*c* (or its gasket) is held by a corresponding spring in an advanced position. The dimensions of the plate 5*c* with the corresponding appendages, of the body 5*a* with the corresponding cavities and guides, as well as of the tips of the perforating device 5*b*, are such that, when at rest, the plate 5*c* is held by the corresponding spring in the aforesaid advanced position (visible, for example, in FIG. 4), where each tip engages or is substantially coaxial to a respective hole of the front wall of the plate itself and of the corresponding gasket, but without substantially coming out thereof. As will be seen hereinafter, instead, in a position for carrying out infusion or preparing the liquid product, the thrust on the plate 5*c* exerted by means of a capsule 30 causes the perforating device 5*b* to assume an operative or extracted condition, where its tips project from the holes of the plate 5*c*, following upon recession of the latter towards the inside of the cavity of the body 5*a*, countering the elastic reaction of the corresponding spring. As has been mentioned, in any case, the injector 50 may be provided with a perforating device of some other type, and not necessarily provided with tips, there possibly being sufficient also reliefs designed to bring about tearing of the wall or foil 34 of the capsule 30.

An example of overall operation of a machine according to the invention will now be described with reference to FIGS. 4, 6 and 14-18, in which the same reference numbers as those adopted in the previous figures are used to designate elements technically equivalent to the ones described above. It should moreover be noted that, for greater clarity of illustration, in some of the figures the representation and/or indication of certain details that are not indispensable for an understanding of the invention has been omitted.

FIGS. 4 and 6 illustrate, in various cross sections, the assembly 1 with the capsule-holder 3 in a retracted position, respectively; FIGS. 14-15 are cross sections similar to those of FIGS. 4 and 6, but with the capsule-holder 3 advancing; FIGS. 16-17 are similar to FIGS. 4 and 6 and 14-15, respectively, but with the capsule-holder 3 and the injector 5 in the position for carrying out infusion where they are set close up to one another; FIG. 18 is similar to FIGS. 4, 14 and 16, with the capsule-holder 3 at the end of a travel of recession thereof (i.e., in a condition substantially corresponding to that of FIG. 4).

As has already been seen, the assembly 1 has a loading arrangement, aimed at enabling guided insertion, from above, of a capsule 30, in a direction that is generally transverse to the direction of relative displacement of the two parts 3, 5 of the infusion chamber. The aforesaid loading arrangement includes the upper entry passage 6, which opens substantially in an intermediate area between the capsule-holder 3 and the injector 5. The passage 6 and the guide 7 are shaped and have dimensions such as to enable introduction of a capsule 30 in a substantially vertical loading direction, here transverse to the axis A, with an orientation such that the foil 34 of the capsule 30 faces the injector 5, i.e., the sensor 9. On the opposite side with respect to the guide 7 the casing 2 has a lower exit passage 2*a*, for unloading the spent capsule 30 from the assembly 1. As has already been explained, the passage 6 and the guide 7 are shaped and have dimensions such as to guide with relative precision a capsule 30 towards two retaining areas, which are set downstream of one another, here identified by the jaws 14; the exit passage 2*a* preferably has dimensions larger than the entry passage in order to enable the capsule 30 to drop freely by gravity out of the casing 2.

In the loading step, with the actuation system 22 in the initial position (FIGS. 4 and 6), the capsule-holder 3 is in the respective retracted loading position, i.e., set at a distance from the injector 5.

After manual opening of the hatch 11 a capsule 30 can be introduced into the guide 7. The capsule 30 is inserted into the guide with its flange 32*c* set generally vertical that engages the opposed cavities 7*a* of the guide 7. The capsule proceeds by gravity until it encounters the first retaining means 15 (FIGS. 7-10) defined by the opposed jaws 14, which arrest the movement thereof in the direction established by the guide 7; in the case exemplified, in the position of retention determined by the elements 15, the capsule 30 is in any case still within the guide 7 (see also FIG. 1).

Switching of the switch 12 caused by opening of the hatch 11 activates the sensor 13, which detects the presence of the capsule 30 in the intermediate position of retention (FIG. 4), thereby enabling the step of acquisition of an image of at least one portion of the foil 34 via the optical sensor 9, based on which the control unit 60 is able to recognize the type of introduced capsule and to select a set of brewing information deemed to be optimal to obtain the corresponding liquid product. Information representing optimal modes of preparation of a liquid product may comprise for example the temperature of the water to be injected or that of the product to be delivered, the water pressure, the water amount, particular cycles of operation of the pump of the machine, such as for example presence or not of a pre-infusion step (i.e., a step of activation of the pump for a predetermined time, such to enable injection of a first liquid volume into the capsule, which is followed by a pause in the injection of liquid and a new activation of the pump, to obtain the actual delivery of the liquid product). In what follows, it is assumed that the used brewing information are information representative of the temperature of the water to be injected and of at least one of the pressure and the amount of water to be injected. The brewing information may include values of preparation parameters (for example, a value of temperature of the liquid) and/or information representing preparation parameters: with reference to this latter case, considering for example a volume or a pressure of liquid to be injected into the capsule, the corresponding brewing information may include—instead of the value of the aforesaid volume or pressure—information of control of the pump aimed at obtaining that given volume or that given pressure, such as for example the time of activation of the pump or the number of pulses of the pump necessary to obtain that given volume or pressure.

In accordance with the invention, the encoded instructions contained in the non-volatile memory means 62 already comprise these sets of brewing information, which are differentiated depending upon the type of capsule 30. In other terms, sets of information—that include each information of temperature and information of at least one of pressure and amount of the fluid to be injected—are not read from time to time from the capsule inserted in the machine, but are pre-memorized in the control system thereof.

In one said embodiment, the processing means 61 are prearranged to compare an image acquired via the optical sensor 9 with a series of reference images, encoder in the memory means 62, and to consequently associate one of the aforesaid sets of brewing information to a corresponding type of capsule, in order to start in an automatic way a mode of operation of the machine among the plurality of possible operation modes, each being distinguished by its own set of brewing information.

In other words, according to the above approach, all the information that the control unit requires for the purposes of optimal preparation of the liquid product of a given capsule are already contained in the memory means of the machine, and the control logic merely has to recognize the type of capsule introduced into machine. On the basis of the embodiment proposed, the type of capsule is recognized by acquiring an image of its sealing foil (but it could also be an image of the bottom wall of the capsule), which is then compared with reference images contained in the memory means.

For instance, a first database encoded in the memory means 62 contains digitalized images of a plurality of different capsules, also capsules of different manufacturers and/or different types of capsule for each manufacturer. A second database encoded in the memory means 62 contains a plurality of sets of information on optimal preparation, each of which is associated to the images of a respective encoded capsule, for example the capsule of each manufacturer, or each of the capsules of one manufacturer, if this manufacturer puts different types of capsules on the market.

The image of a portion of the sealing foil 34 of a capsule acquired via the optical sensor 9 is compared with those contained in the first database, using image-comparison techniques in themselves known. Preferentially, the first database contains a plurality of reference images for each type of capsule, in each of which a substantial portion of the sealing foil of that capsule has a different angular position: in this way, recognition of the capsule is totally independent of the angular position assumed by the foil 34 of a capsule 30 with respect to the sensor 9, after the aforesaid capsule has been inserted into the dispensing assembly 1 through the guide 7.

Alternatively, it is also possible to encode in the first database a single reference image for each type of capsule, with a given angular position, and to program the processing means 61 so that they perform a rotation of the image acquired via the sensor 9, for the purposes of comparison with the reference one. Such a variant presupposes a greater processing capacity of the processing means 61, with a lengthening of the recognition times.

The type of recognition proposed can be executed perfectly with relatively low reading resolutions by the optical sensor 9 so that also the reference images may be at low resolution, with consequent contained dimensions in terms of number of bits and hence a relatively modest capacity of the memory means 62. For the same reason the sensor device 9 may be a commercially available video camera or photographic camera of a Charge-Coupled Device or Complementary Metal-Oxide-Semiconductor type, with low resolution and very contained cost.

The solution proposed is based upon recognition of the fact that different capsules, even capsules of various manufacturers, carry on the respective sealing foils different graphic symbols such as to enable easy reading by an optical image-acquisition sensor with a relatively low resolution. Given the differences between the different capsules, the image analysis may even be limited to just a portion of the foil 34, which will be preferentially a central portion, inscribed in a circular area concentric with respect to the foil of the capsule.

This enables also recognition of the various types of capsule marketed by one and the same manufacturer given that, in practically all cases, the sealing foils of two types of capsules of a different manufacturer present in any case some elements of differentiation. For instance, the foil of the capsule "X" of the manufacturer "Y" will carry the name or trademark of the manufacturer and the name or a logo assigned to the specific liquid product associated to the capsule "Y" (for example, ristretto); the capsule "Z" of the same manufacturer "Y" will carry, in addition to the same name or trademark, the name or the logo assigned to the different liquid product associated to the capsule "Z" (for example, lungo). Consequently, in this perspective, the graphic information associated to the sealing foil 34 of a capsule 30 may comprise a proprietary graphic sign of the manufacturer of the capsule, such as a distinctive sign, and at least one auxiliary graphic element, identifying the liquid foodstuff product corresponding to that type of capsule of that particular manufacturer.

In the case of the implementation proposed, in which the sets of brewing information are already stored in the control system of the machine, the encoded instructions contained in the memory means 62 may comprise a single operating program, which can be modified via the sets of brewing information associated each time to reading of the image of a capsule 30 to obtain the plurality of operating modes of the machine 50. Alternatively, even though this presupposes a greater capacity of the memory means 62, there may be stored a plurality of different operating programs corresponding to different possible operating modes of the machine, where each of these programs is distinguished by the set of brewing information of a corresponding type of capsule.

Turing back to the general operation of the machine, the unit 60 controls the boiler 54 to obtain the optimal temperature for the infusion water, in function of the corresponding information of the selected set of brewing information.

A thrust must be applied to the capsule 30 in the direction of movement determined by the guide 7 in order to switch the first retaining elements 15 from the respective intermediate retention condition to a respective condition of release. The thrust exerted on the capsule 30 determines a slight divarication of the jaws 14, such as to free the capsule 30 from the elements 15 and enable prosecution of its displacement by gravity as far as the loading position, determined by the second retaining elements 16 (FIGS. 7-9). The thrust may be imparted on the capsule 30 manually, for example using a finger, or else, more conveniently, the hatch 11 may have a lower appendage designed to project within the passage 8 of the guide 7 in such a way that upon closing of the hatch 11 the aforesaid appendage exerts on the capsule the thrust downwards necessary to cause release thereof from the retaining elements 15.

In its loading position, the capsule 30 is kept by the second retaining elements 16 of the jaws 14 substantially coaxial to the capsule-holder 3 and to the injector 5, between these two parts of the infusion chamber that are still in the spaced-apart position (see, as regards the position of the capsule, FIGS. 14-15). In this condition, the foil 34 of the capsule faces the front surface of the plate 5c of the injector 5, i.e., its front gasket, at a short distance therefrom.

The operating cycle of the machine then envisages actuation of the actuation system 22, which determines progressive advance of the capsule-holder 3 towards the injector 5. At a certain point of advance towards the injector 5, the capsule-holder 3 comes into contact with the jaws 14: as has been said, the front edge of the capsule-holder 3 or some other purposely provided elements of its body 4 may present an inclined plane that is able to interact with a homologous inclined or lead-in plane 14d of the jaws 14: it should be noted that in this step as exemplified in FIGS. 14-15 the capsule 30 is already partially introduced into the capsule-holder 3. In the sequel of the movement according to the axis A, then, there is brought about progressive divarication or opening of the jaws 14 and progressive entry of the capsule 30 into the housing 4a of the capsule-holder 3. The capsule 30, since it is already partially received in the housing 4a and given the advanced condition of the plate 5c of the injector, cannot drop down and is taken up by the capsule-holder. More the particular, following upon the interference described above with the body 4 of the capsule-holder 3 and the subsequent further advance of the latter, the jaws 14 reach and maintain a condition of maximum opening, as may be seen, for example, in FIG. 17, where the flange of the capsule 30 is no longer engaged in the grooves 14a of the jaws 14 (i.e., in the retaining elements 16 of FIG. 7). The front edge of the capsule-holder 3 comes into contact with the flange of the capsule 30 so as to push it forcedly against the plate 5c of the injector 5, with the capsule 30 that cannot penetrate further into the housing defined by the body of the capsule-holder, as may be seen precisely in FIGS. 16 and 17.

Simultaneously with the steps described above, during advance of the capsule-holder 3, the front ends of the coupling members 21 and in particular the inclined plane of the corresponding front teeth come at a certain point into contact with the annular flange of the capsule 30. It should be noted that the position and dimensions of the elements involved (capsule 30, capsule-holder 3, engagement members 21) are such that at the moment of contact between the engagement members 21 and the flange of the capsule, the latter is already introduced for the most part into the housing 4a. It should likewise be noted that in these steps the conicity of the capsule 30 and of the housing 4a determine a sort of self-centring of the capsule itself with respect to the housing 4a and to the injector 5. As the capsule-holder 3 continues to advance, and after it has completely passed beyond the edge of the flange of the capsule 30, the front teeth of the engagement members 21 penetrate into the recesses 5d of the plate 5c, as far as the final end-of-travel position of the capsule-holder 3, visible in FIG. 16, where the front of the capsule 30 is set up against the front gasket of the plate 5c, by means of the front edge of the capsule-holder 3.

In various embodiments it may be envisaged that, when the condition represented in FIGS. 16-17 is reached, the peripheral region of the bottom wall of the capsule 30 bears upon a peripheral region of the wall of the perforating device 19 not provided with tips (for example, in the case of the bottom wall with concavity as represented in FIG. 12) so that the bottom of the capsule is not initially perforated. In other embodiments, it is possible to envisage that the bottom wall of the capsule has been set up against the tips of the perforating device 19 without this determining a substantial perforation or tearing of the bottom, or again that the bottom comes to occupy a position at a short distance from the aforesaid tips: this can be obtained by appropriately sizing the housing 4a, and in particular the height of its front edge bearing upon which is the flange of the capsule 30. In other embodiments it may once again be envisaged that, when the position of arrest of the capsule 30 within the capsule-holder 3 is reached, the bottom of the former has already been perforated by the tips of the perforating device 19. As has been said, moreover, in the case of an assembly 30 for pre-perforated capsules, it is not necessary to provide the perforating device 19.

Irrespective of the practical implementation chosen, as has been said, at a certain point of advance, the capsule 30 is unable to penetrate any further into the capsule-holder 3. The capsule-holder 3 continues in any case to advance, and this brings about yielding of the spring inside the injector 5, and thus recession of the plate 5c that is bearing upon the foil of the capsule 30. The above recession, and the simultaneous advance of the capsule-holder 3, has, as consequence, that the tips of the perforating device 5b of the injector 5 exit from the corresponding holes of the plate 5c and perforate the foil of the capsule, as far as the position of maximum advance of the capsule-holder 3, visible in FIGS. 16-17.

As the capsule-holder advances from the position of FIG. 4 to that of FIG. 16, the rear end of the stem 20 is pushed by the corresponding spring 20b against the cam surface defined by the member 23, fixed in rotation with respect to the shaft 22a. This cam surface is parameterized in such a way that, in any case, corresponding to advance of the capsule-holder 3 is a progressive recession of the leading end of the stem 20 within the housing 4a. The position of maximum recession of the stem 20 is precisely visible in FIGS. 16-17. Conveniently, the sealing ring at the leading end of the stem 20 co-operates with the bottom wall of the body 4 in order to prevent passage of liquid towards the inside of the passage in which the stem 20 slides.

In the case of a machine 50 with an automatically operated motor-driven mechanism 22, reaching of the end-of-travel position forwards (FIGS. 13-14) can be detected via a suitable sensor means (not represented), for example a micro-switch, which informs the control unit 60 accordingly. The latter thus activates the pump 53 in order to supply to the injector 5—via the duct 58 of FIG. 8—hot water at the pressure and/or in the amount defined on the basis of the corresponding information of the set of brewing information that the control unit 60 has previously selected on the basis of the image of the capsule 30 acquired thanks to the sensor 9. In the case of machines with mechanism 22 operated via the lever 22b, activation of the pump 53 can be governed directly by the user, by pressing a push-button.

The hot water under pressure is thus forced into the capsule 30, by means of the tips of the perforating device 5b of the injector 5, to obtain the infusion with the ground product (for example, coffee) contained in the capsule 30. In this step, the front gasket of the plate 5c improves the fluid tightness in regard to the sealing foil of the capsule 30, during introduction into the latter of water under pressure. In the case where the bottom of the capsule 30 had already been previously perforated by the tips of the perforating device 19, the liquid product generated by the infusion can flow out through the duct 18. In other embodiments—and as has already been mentioned above—it may be envisaged, instead, that, at start of injection of hot water under pressure into the capsule 30, the bottom of the latter has not yet been perforated. In these embodiments, at a certain point subsequent to start of injection of hot water, the pressure that is set up within the capsule 30 causes its bottom to start to undergo deformation and be pushed against the tips or reliefs of the perforating device 19, until perforation or tearing is obtained, which enables outflow of the liquid product towards the duct 18. As has been said, on the other hand, at least one of the perforating devices 19 and 5b may not be present, in the case of pre-perforated capsules.

The unit 60 then deactivates the pump 53, when the amount and/or pressure of the fluid delivered correspond to those deduced on the basis of the graphic code associated to the capsule 30. At the end of delivery of the liquid product, the actuation system 22 can be driven in a direction opposite to the previous one to bring the capsule-holder 3 back into the initial position of FIGS. 4 and 6. With recession of the capsule-holder 3 there is obtained a sliding of its body 4 with respect to the jaws 14 opposite to the one described previously and a recession of the coupling members 21. Shortly after start of the recession, then, the front teeth of the coupling members 21 come back into contact with the front part of the flange of the capsule 30 (i.e., its part covered by the foil 34). Following upon the aforesaid engagement, then, and while the capsule-holder 3 continues its recession, the foil of the capsule is "slid out" of the tips of the perforating device 5b of the injector 5—when the aforesaid device is present—or in any case progressively retracted with respect to the body 5a of the injector 5, accompanied in this process by the plate 5c, thanks to the action of the corresponding spring. Even if the capsule 30 had remained stuck at the bottom, with interference, in the capsule-holder 3, recession of the latter would cause progressive separation of the capsule from the injector. In this step, the jaws 14 are in any case still kept in a divaricated condition by the body of the capsule-holder 3, i.e., by the corresponding elements responsible for this: in this way, the flange of the spent capsule cannot be withheld by the jaws 14. In practice, then, the arrangement is such that—when, upon ceasing of the action of divarication operated by the body 4, the jaws 14 re-close—the jaws themselves have already been overtaken in the movement of recession by the flange of the capsule 30.

Also in the course of recession of the capsule-holder 3, the rear end of the stem 20 is kept by the corresponding spring 20b in contact with the cam surface defined by the member 23, with a sliding opposite to the previous one: in this way, in the prosecution of the recession, the leading end of the stem 20 presses on the bottom of the capsule 30, pushing it out of the housing 4a, thereby bringing about also extraction of the tips of the perforating device 19 from the bottom of the spent capsule, when the aforesaid perforating device is present. The thrust exerted in this way by the stem 20 on the bottom of the capsule 30 is such as to overcome in any case also any possible mechanical interference between the body of the capsule and the internal surface of the housing 4a. In the course of recession of the capsule-holder 3 (and hence of a controlled advance therein of the capsule, thanks to the action of the stem 20) the flange of the capsule is pressed against the front teeth of the coupling members 21, until it causes divarication of the latter, which can then be re-closed after the flange has passed beyond the aforesaid teeth in its advance. When the flange of the capsule is no longer withheld by the members 21, the spent cartridge can reach a position resembling the one visible in FIG. 18, where the cartridge itself is set in a position suitable to drop towards the underlying exit passage 2b. The assembly 1 then returns to the initial condition of FIGS. 4 and 6, ready for receiving a new capsule 30.

Obviously, it is possible that capsules of a new type are introduced on the market, the images and sets of brewing information of which are not (yet) encoded in the memory means 62 of the machine 50. For such a case, in a preferred embodiment, the sets of brewing information or the corresponding programs encoded in the memory means comprise at least one predetermined set of information or one predetermined program, to which there corresponds a predetermined operating mode of the machine, for example distinguished by average or safety values of temperature and amount and/or pressure. In this embodiment, the processing means 61 of the control unit are provided for starting off this predetermined operating mode in the case where the image acquired via the optical sensor device 9 is not congruent with any of the reference images encoded in the nonvolatile-memory means 62. By so doing, operation of the machine can be in any case guaranteed, even for capsules of a type not encoded in the control system, thus obtaining a liquid product of an acceptable quality.

Preferentially, the machine 50 is provided with means for updating and/or modifying at least one between the instructions and the reference images encoded in the non-volatile-memory means.

In one embodiment, the machine 50 is provided with a communication device, designated as a whole by 63 in FIG. 10, for example represented by a communication port of the control unit 60. Via such a port (for example, a USB port) the software of the machine, for example the aforesaid databases, can be updated, via entry of sets of information or programs for preparation for new commercially available capsules and of the corresponding reference images, obviously in an encoded form. The communication device 63 used for updating the software of the machine 50 may also include a modem or the like, for interconnection of the control system to a communication network (for example, a telephone network or the Internet) for receiving the updating data, or again a wireless transceiver, for example of a Wi-Fi or Bluetooth type. In the latter case, for example, via a personal device of its own, such as a personal computer or a Smart Phone, the owner of a machine according to the invention can download from a dedicated website the updating software and then carry out the corresponding upload into the control unit 60, with the aid of a suitable utility made available by the manufacturer of the machine.

In one embodiment, the means for updating and/or modifying at least one between the instructions and the reference images encoded in the non-volatile-memory means 62 may include the optical sensor 9 itself. For such a case, for example, it is possible to envisage for the control unit 60 a programming mode, which can be activated via at least one dedicated key or else by pressing—according to a specific combination and/or sequence—one or more control keys provided in any case on the machine for other functions. For instance, in one embodiment, the machine may be provided with a display 64 and a small keypad, which constitutes a communication device. By pressing a key, the programming mode is activated, which is to be followed by introduction into the machine of the capsule of a new type, according to the modalities described previously. After introduction of the capsule and acquisition of the corresponding image, the unit 60 sets itself in a step where it waits for preparation parameters regarding that particular capsule, which parameters may be made available by the manufacturer of the capsule, for example through its website or directly on the package of the capsules. The sequence of entry of the parameters (for example, temperature, pressure, and amount of the water) is determined by the unit 60, by issuing a command for showing on the display 64 the corresponding requests. In a possible embodiment, appearing on the display 64 is the request for the first parameter for example starting from a basic value (e.g., temperature=80° C.) that the user can modify either increasing it or reducing it by pressing the keys "+" and "−" provided for the purpose until the value recommended for the parameter is reached which is then confirmed by pressing the purposely provided key; the unit 60 then issues a command for display of the request regarding the second parameter, for example the pressure, and so forth for all the other parameters requested. At the end of entry, there can be highlighted on the display a request for storage of the parameters associated to the image acquired, which will then be done by the unit 60 after the confirmation key has been pressed. In such a variant, the control unit 60 can itself be provided for generating the necessary series of reference images differentiated from one another in terms of angular positioning, starting from the image acquired via the sensor 9.

Another possible solution is to provide a programming device having a respective body that can be inserted into the dispensing assembly 1 of the machine 50, in particular a body substantially similar to that of a capsule 30. In such an embodiment "programming capsules" are basically provided, which do not necessarily contain the ingredients of a liquid product, but have the main function of carrying the data for updating the machine 50 for a given type of capsules. For instance, the control system of the machine 50 may include a reader of RFID tags, designated in FIG. 10 by 65, and the aforesaid programming capsules—one of which is designated by 30' once again in FIG. 10—include an RFID tag 30a that can be read by the reader 65, in which the program and/or the optimal brewing information of the liquid product referred to in the aforesaid type of capsules 30 are/is encoded. The programming capsule 30' then has a respective foil 34 bearing the graphic symbols characteristic of the type of capsules in question. In such an implementation, after start of a programming step (for example, by pressing a key or a sequence/combination of keys), the control system goes into a waiting step. The programming capsule 30' is inserted into the assembly 1, and the control unit 60 acquires the image of its foil 34 or of a substantial portion thereof, used to encode the image or the reference images to be stored in the memory means. In the memory means, associated to this image or set of images is the program or the optimal brewing information, which is acquired by the reader 65 directly from the tag 30a associated to the programming capsule 30'. In another embodiment an end wall of the programming capsule 30', for instance the front wall, may carry the program and/or the brewing information in the form of a code, for example a bi-dimensional barcode, which can be read by the control system via the device 9.

It will be appreciated that, thanks to the invention, the machine 50 is in a condition to operate automatically in an operating mode deemed optimal with different capsules, even with capsules of different manufacturers, including different capsules of one and the same manufacturer, this further favouring the range of choice of the end consumer, who, with complete satisfaction, will be able to use on his own machine capsules of different origin. In this way, the limits of known machines provided with systems for automatic recognition of capsules, which are proposed by certain manufacturers in order to impose a "forced loyalty" on the consumer, are overcome. With the system proposed, in fact, the machine is also able to use capsules of different manufacturers bearing graphic codes different from one another.

The various manufacturers will be induced to propose kits comprising a plurality of types of capsules, to each of which there will correspond a respective liquid food product, but without any need to provide on the capsules complex and unsightly graphic codes, or else additional elements such as magnetic insert of RFID tags. As has been explained, in fact, the machine according to invention enables exploitation, as graphic code, simplified symbols that are, however, necessary and useful for the manufacturers, which are not based upon binary encoding. For instance, these simplified symbols may comprise a proprietary distinctive sign of the manufacturer of the capsule—such as the name or trademark, which will be in common with the capsules of the manufacturer's kit—and at least one auxiliary graphic element, identifying the liquid foodstuff product corresponding to the type of capsule of the kit.

The auxiliary graphic element may be an alphabetic and/or numeric and/or abstract graphic sign that is additional to the proprietary distinctive sign, or else may be a graphic element of differentiation of the proprietary distinctive sign itself. FIG. 19 illustrates, merely by way of example, some of the ample possibilities of differentiation of characters (whether they be alphabetic and/or numeric and/or abstract) of a distinctive sign, which here is assumed to be represented by a hypothetical trademark "Coffee".

For instance, the parts A, B, C and D of FIG. 19 exemplify how the element of differentiation between a number of capsules of one and the same manufacturer can be constituted by a size (part A) of one or more characters of the distinctive sign, a horizontal spacing (part B) between two or more characters of the distinctive sign, the font and/or contour (part C) of one or more characters of the distinctive sign, and the colour (part D) of one or more characters of the distinctive sign. The part E exemplifies the case of differentiation in the background of the distinctive sign (one or more colours or textures), whereas the parts F and G exemplify any differentiation via one or more additional graphic elements with respect to the distinctive sign. One and the same additional element can be variously positioned with respect to the main sign (as in the case of part F), or else additional differentiated elements (part G) may be provided, possibly devised to function also as elements of orientation aimed at facilitating the comparison of the image acquired via the sensor 9 with the reference images stored.

Obviously, the possibilities of differentiation are innumerable, including the filling-in of at least one alphabetic and/or numeric and/or abstract character and/or of a background of the proprietary graphic sign, as well as the vertical or interlinear spacing between characters.

From the foregoing description, the characteristics of the present invention emerge clearly, as likewise its advantages. It is evident that numerous variants may be made by the person skilled in the branch to the machine, the system, and the method described by way of example, without thereby departing from the scope of the invention as defined by the ensuing claims.

In a possible embodiment, the machine according to the invention is provided for operating automatically in an operating mode deemed safe only for the types of capsules for which it has been designed or that can be recognized by its control logic. Otherwise, the machine may activate an operating mode that renders dispensing from a non-recognizable capsule safe such as an operating mode being based upon the predetermined set of information or upon the predetermined program referred to previously or else deactivate its operation altogether. In this way, the end user will be sure that he can use the machine in the conditions of safety guaranteed by the manufacturer. For a better understanding of this aspect, consider, for example, that commercially available capsules may have structures different from one another, in terms of the type of materials used, such as the plastic material constituting the capsule body. For instance, in the case of a capsule with an excessively thin plastic body, it may happen that injection of liquid at a high temperature brings about a significant deformation or failure of the structure of the capsule such as to cause damage to the machine, with consequent risks for the user. The solution of envisaging an operating mode deemed safe for the recognizable types of capsules thus enables considerable benefits to be achieved also in the perspective of safety for the end user.

The invention claimed is:

1. A machine for the preparation of liquid food products able to operate with a plurality of capsules that have a substantially cup-shaped body with two generally opposite end walls that houses a dose of at least one substance that can form a liquid food product using a fluid comprising water and/or steam, the machine comprising:
   a dispensing assembly having a first part and a second part capable of defining an infusion chamber, at least the first part defining a housing configured to receive at least partially one said capsule, wherein one of the first part and the second part of the infusion chamber is configured for the injection of the fluid in the capsule and the other one of the first part and the second part is configured for the delivery of the liquid food product from the infusion chamber;
   a loading arrangement for insertion of the capsule into the dispensing assembly, as far as a loading position thereof;
   an actuation system, that can be operated to cause relative movements between the first part and the second part of the infusion chamber from a spaced-apart position, in which the capsule can reach the loading position, and a close position, in which the first part and the second part define therebetween the infusion chamber to enable injection of the fluid in the capsule;
   an electric heater configured for heating the fluid and a pumping arrangement configured for feeding the fluid, the electric heater and the pumping arrangement being controllable for supplying the fluid to the infusion chamber at a determined temperature and with one of pressure and quantity substantially determined;
   a control system, including a controller, a non-volatile memory and an optical sensor device to acquire an image of at least one portion of at least one of said end walls of the capsule body to which there is associated graphical information representative of a type of capsule;
   wherein the controller is prearranged for controlling at least the electric heater and the pumping arrangement to obtain a plurality of possible operation modes of the machine on the basis of encoded instructions contained in the non-volatile memory and of said graphical information representative of the type of capsule;
   wherein the instructions contained in the non-volatile memory means comprise sets of brewing information that are differentiated from each other according to the type of capsule, the sets of brewing information each including information representative of a value of temperature and information representative of a value of least one of pressure and quantity of the fluid to be injected in such type of capsule;
   wherein controller is prearranged for operating in a normal operating mode, in said normal operating mode the controller comparing said image acquired by means of the optical sensor device with a plurality of reference images that are encoded in the non-volatile memory and consequently associates one said set of brewing information to such type of capsule, in order to select one from said plurality of possible operation modes of the machine among the plurality of possible operation modes,
   wherein the machine further comprises an updating arrangement for updating and/or changing at least one of the instructions and the reference images encoded in the non-volatile memory,
   and wherein the controller is adapted to be entered in a programming mode, in which the controller controls the updating arrangement for acquisition of a new reference image from the capsule via the optical sensor device and for encoding information representative of said new reference image in the non-volatile memory among at least one of the instructions and the reference images.

2. The machine according to claim 1, wherein the sets of brewing information comprise a predetermined set of information, to which there corresponds a predetermined operation mode of the machine, and wherein the controller is prearranged for selecting the predetermined operation mode if the image acquired by means of the optical sensor device, when the controller is operating in the normal operating mode thereof, is not congruent with any of the reference images encoded in the non-volatile memory.

3. The machine according to claim 1, wherein the instructions encoded in the non-volatile memory comprise an operation program that can be changed via the sets of brewing information to obtain the plurality of operation modes of the machine.

4. The machine according to claim 1, wherein the sets of brewing information each belong to an operation program corresponding to a respective operation mode of the machine encoded in the non-volatile memory.

5. The machine according to claim 1, wherein the loading arrangement comprises a first retaining arrangement, operatively set along a displacement path of the capsule upstream of the loading position, the first retaining arrangement defining an intermediate retention position of the capsule at a detection active-part of the optical sensor device, in such a way that the optical sensor device is capable of acquiring said image when the capsule is in said intermediate retention position.

6. The machine according to claim 5, wherein the first retaining arrangement is switchable from a condition of retention to a second condition of release of the capsule by applying on the capsule itself a thrust force in a direction of insertion, such that the capsule proceeds along the displacement path towards said loading position.

7. The machine according to claim 1, wherein the updating arrangement includes at least one dedicated key operable by a user to command entering of the controller in said programming mode.

8. The machine according to claim 1, wherein the updating arrangement includes one or more control keys operable by a user according to a specific combination and/or sequence to command entering of the controller in said programming mode.

9. The machine according to claim 1, wherein the updating arrangement comprises a display, the controller being configured for showing on the display, after entry in said programming mode, a request of at least one programming parameter to be associated to one said new image acquired via the optical sensor device.

10. The machine according to claim 9, wherein the updating arrangement also comprises a keypad, the keypad having at least one key operable by a user to command entering of the controller in said programming mode, and wherein the controller is configured for showing on the display, after entry in said programming mode, a request of at least one programming parameter to be associated to one said new image acquired via the optical sensor device.

11. The machine according to claim 9, wherein the updating arrangement comprises a keypad, the keypad having at least one key operable by a user to input at least one programming parameter to be associated to one said new image acquired via the optical sensor device when the controller is in the programming mode thereof.

12. The machine according to claim 1, wherein said image comprises a code representative of at least one of an operating program and a set of brewing information.

* * * * *